(12) United States Patent
Koh et al.

(10) Patent No.: US 10,316,236 B2
(45) Date of Patent: Jun. 11, 2019

(54) PASTE COMPOSITION, HEATING ELEMENT, HEATING APPARATUS, AND METHOD OF MANUFACTURING THE PASTE COMPOSITION

(71) Applicant: Samsung Electronics Co., Ltd., Suwon-si, Gyeonggi-do (KR)

(72) Inventors: Haengdeog Koh, Hwaseong-si (KR); Hajin Kim, Hwaseong-si (KR); Seyun Kim, Seoul (KR); Soichiro Mizusaki, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 34 days.

(21) Appl. No.: 15/368,014

(22) Filed: Dec. 2, 2016

(65) Prior Publication Data

US 2017/0158935 A1   Jun. 8, 2017

(30) Foreign Application Priority Data

Dec. 4, 2015   (KR) .......................... 10-2015-0172654

(51) Int. Cl.
| | |
|---|---|
| *H01B 1/04* | (2006.01) |
| *H01B 1/22* | (2006.01) |
| *C01B 32/174* | (2017.01) |
| *C09K 5/14* | (2006.01) |
| *C09D 5/24* | (2006.01) |
| *H05B 3/14* | (2006.01) |

(Continued)

(52) U.S. Cl.
CPC .............. *C09K 5/14* (2013.01); *C01B 32/174* (2017.08); *C09D 5/24* (2013.01); *C09D 7/70* (2018.01); *H05B 3/145* (2013.01); *H05B 3/20* (2013.01); *B82Y 30/00* (2013.01); *B82Y 40/00* (2013.01); *C01B 2202/22* (2013.01); *C08K 3/041* (2017.05); *H05B 2203/013* (2013.01); *H05B 2203/017* (2013.01); *H05B 2214/04* (2013.01); *Y10S 977/745* (2013.01); *Y10S 977/847* (2013.01); *Y10S 977/932* (2013.01)

(58) Field of Classification Search
CPC ......... B82Y 30/00; C01B 32/174; H01B 1/04; H01B 1/08
USPC ................ 252/500, 502, 506, 507, 508, 509
See application file for complete search history.

(56) References Cited

U.S. PATENT DOCUMENTS

| | | |
|---|---|---|
| 9,237,606 B2 | 1/2016 | Yue et al. |
| 9,241,434 B2 | 1/2016 | Park et al. |

(Continued)

FOREIGN PATENT DOCUMENTS

| | | |
|---|---|---|
| JP | 5382756 B2 | 10/2013 |
| KR | 1020100093643 A | 8/2010 |

(Continued)

OTHER PUBLICATIONS

Sun "Noncovalent attachment of oxide nanoparticles onto carbon nanotubes using water-in-oil microemulsions." C h e m . C o m m u n . , 2004 , 832-833 (Year: 2004).*

(Continued)

*Primary Examiner* — Tri V Nguyen
(74) *Attorney, Agent, or Firm* — Cantor Colburn LLP

(57) ABSTRACT

A paste composition including: a carbon nanotube; a microemulsion adsorbed on a surface of the carbon nanotube, wherein the microemulsion includes a metal precursor and a surfactant; and an organic vehicle.

20 Claims, 15 Drawing Sheets

(51) Int. Cl.
  *H05B 3/20* (2006.01)
  *C09D 7/40* (2018.01)
  *B82Y 30/00* (2011.01)
  *B82Y 40/00* (2011.01)
  *C08K 3/04* (2006.01)

(56) References Cited

U.S. PATENT DOCUMENTS

| 9,272,902 | B2 | 3/2016 | Kim et al. | |
| 2007/0024177 | A1* | 2/2007 | Choi | B82Y 10/00 |
| | | | | 313/495 |
| 2008/0206488 | A1* | 8/2008 | Chung | C09D 5/24 |
| | | | | 427/596 |
| 2009/0075157 | A1* | 3/2009 | Pak | B82Y 30/00 |
| | | | | 429/530 |

FOREIGN PATENT DOCUMENTS

| KR | 1020130034183 A | 4/2013 | |
| KR | 1020130097479 A | 9/2013 | |
| KR | 1020130104842 A | 9/2013 | |
| KR | 101454454 B1 * | 10/2014 | ............ C01B 31/00 |

OTHER PUBLICATIONS

Yoon "Microemulsion-Templated Synthesis of Carbon Nanotube-Supported Pd and Rh Nanoparticles for Catalytic Applications." JACS, 127, 17174-17175 (Year: 2005).*

Kawai "Oxidation Resistant Coating of TiC-SiC System on C/C Composite by Chemical Vapor Deposition." Journal of the Ceramic Society of Japan,vol. 99 Issue 1149 pp. 390-394 (Year: 1991).*

Jiu "Ag nanowires: large-scale synthesis via a trace-salt-assisted solvothermal process and application in transparent electrodes." J Nanopart Res (2013) 15:1588 (Year: 2013).*

Aksel et al., "Catalytic effect of metal oxides on the oxidation resistance in carbon nanotube-inorganic hybrids", Journal of Materials Chemistry, 20, 2010, pp. 9149-9154.

Fergus et al., "Silicon-Carbide/Boron-Containing Coatings for the Oxidation Protection of Graphite", Carbon, vol. 33, No. 4, 1995, pp. 537-543.

Ghosh et al., "Synthesis of mesoporous x-alumina nanorods using a double surfactant system by reverse microemulsion process+", RSC Advances, 3, 2013, 4207.

Guo et al., "Oxidation protection of graphite and B4C-modified graphite by a SiC coating", Letters to the Editor, Carbon, 37, 1999. pp. 147-163.

Guo et al.,"Multilayered Coatings for Protecting Carbon-Carbon Composites from Oxidation", Carbon, vol. 33, No. 4, pp. 449-453, pub 1995.

Harris et al., "Silicon oxycarbide coatings on graphite fibers: chemistry, processing and oxidation resistance", Materials Science and Engineering A 195, 1995, pp. 223-236.

Hashishin et al., "Oxidation-Resistant Coating of Carbon Fibers with TiO2 b Sol-Gel Method", Journal of the Ceramic Society of Japan, 106(1), 1998, p. 1-5.

Hong et al., "Encapsulation of multi-walled carbon nanotubes by poly(4-vinylpyridine) and its dispersion stability in various solvent media", Synthetic Metals, 158, 2008, pp. 900-907.

Joshi et al., "Coatings with particulate dispersions for high temperature oxidation protection of carbon and C/C composites", Composites Part A, 28A, 1997, pp. 181-189.

Kawabata et al., "Oxidation Resistance of Graphite Powders Coated with Al2O3-Based Oxides", Journal of the Ceramic Society of Japan, 107(9), 1999, pp. 832-837.

Kawai et al., "Oxidation Resistant Coating of TiC-SiC System on C/C Composite by Chemical Vapor Deposition", Japan Ceramics Organization, 99 (5), 1991, pp. 390-394.

Kobayashi et al., "Formation and Oxidation Resistance of the Coating Formed on Carbon Material Composed of B4C-SiC Powders", Carbon, vol. 33, No. 4,1995, pp. 397-403.

Landry et al., "MOCVD of Alumina-Silica Oxidation Resistant Coatings on Carbon Fibers", Carbon, vol. 33, No. 4,1995, pp. 381-387.

Liu et al., "Titanium Nitride/Carbon Coatings on Graphite Fibers", J. Am. Ceram. Soc., 80(3), 1997, pp. 705-716.

Liu et al., "Ultrathin high-temperature oxidation-resistant coatings of hexagonal boron nitride", Nature Communications, 4, Article 2541 (2013). 2013, pp. 1-8.

Lu et al., "Oxidation protection of carbon materials by acid phosphate impregnation", Carbon 40, 2002, pp. 1249-1254.

Sun et al., "Noncovalent attachment of oxide nanoparticles onto carbon nanotubes using water-in-oil microemulsions", The Royal Society of Chemistry, Chem. Commun., 2004, pp. 832-833.

Thomas et al., "Sol-gel route to carbon nanotube borosilicate glass composites", Composites: Part A 40, 2009, pp. 837-845.

Tsou et al., "Design of multilayer plasma-assisted CVD coatings for the oxidation protection of composite materials", Surface and Coatings Technology, 79, 1996, pp. 139-150.

Yamamoto et al., "Antioxidation of Carbon-Carbon Composites by SiC Concentration Gradient and Zircon Overcoating", Carbon, vol. 33, No. 4, pp. 359-365, pub 1995.

Zhu et al., "Formation of a functionally gradient (Si3N4 + SiC)/C layer for the oxidation protection of carbon-carbon composites", Carbon, 37, 1999, pp. 1417-1423.

* cited by examiner

PASTE COMPOSITION, HEATING ELEMENT, HEATING APPARATUS, AND METHOD OF MANUFACTURING THE PASTE COMPOSITION

CROSS-REFERENCE TO RELATED APPLICATION

This application claims the benefit of and priority to Korean Patent Application No. 10-2015-0172654, filed on Dec. 4, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a paste composition, a heating element, a planar heating element, a heating apparatus, and a method of manufacturing the paste composition.

2. Description of the Related Art

Materials for a heating element may include a metallic heating composite and a non-metallic heating composite. Currently used heating elements include a bar-like heater including a Fe—Cr—Al-based, a Ni—Cr-based, or a metal having a high melting point (Pt, Mo, W, or Ta), or a metal tube filled with an inorganic insulating material such as MgO, wherein a surface of the metal tube may be treated with a far-infrared emission material. Examples of a material of the non-metallic heating composite may include silicon carbonate, molybdenum silicide, lanthanum chromite, carbon, and zirconia. Alternatively, a ceramic, such as barium carbonate, or a direct electrified heating element using a thick-film resistor can be used.

Examples of a planar heating element may include a metallic heating element prepared by etching a metal thin film of iron, chrome, nickel, or platinum to provide a direct electrified heating element using a thick-film resistor; or a non-metallic heating element such as a heating element of silicon carbide, zirconia, or carbon. Also, the planar heating element may allow use of resistance heating by being coated with a polymeric insulating material.

There remains a need for improved heating element materials, and methods of preparation thereof.

SUMMARY

Provided is a paste composition that may improve oxidation resistance of an electric conductive filler at a high temperature.

Provided is a heating element including a sintered product of the paste composition.

Provided is a planar heating element including the heating element.

Provided is a heating apparatus including the planar heating element.

Provided is a method of manufacturing the paste composition.

Provided is a method of manufacturing the heating element.

Provided is a method of manufacturing the planar heating element.

Additional aspects will be set forth in part in the description which follows and, in part, will be apparent from the description, or may be learned by practice of the presented embodiments.

According to an aspect of an embodiment, a paste composition includes: a carbon nanotube; a microemulsion adsorbed on a surface of the carbon nanotube, wherein the microemulsion includes a metal precursor and a surfactant; and an organic vehicle.

The microemulsion may have a reverse micelle structure in which the surfactant surrounds the metal precursor.

The metal precursor may be a metal salt comprising at least one selected from aluminum (Al), silicon (Si), magnesium (Mg), zirconium (Zr), tungsten (W), zinc (Zn), titanium (Ti), chrome (Cr), manganese (Mn), bismuth (Bi), tellurium (TI), niobium (Nb), hafnium (Hf), indium (In), tin (Sn), copper (Cu), cobalt (Co), lead (Pb), iron (Fe), molybdenum (Mo), nickel (Ni), and an alloy thereof.

The organic vehicle may include at least one selected from an organic solvent and an organic binder.

The paste composition may further include at least one selected from a metallic filler, an inorganic filler, a glass frit, and an enamel frit.

The paste composition may be sintered within a temperature range of about 400° C. or greater. For example, the paste composition may be sintered within a temperature range of about 400° C. to about 1200° C.

According to an aspect of another embodiment, a heating element includes a sintered product of the paste composition.

According to an aspect of another embodiment, a planar heating element includes the heating element.

According to an aspect of another embodiment, a heating apparatus includes the heating element.

According to an aspect of another embodiment, a method of preparing a paste composition includes: dispersing a surfactant in an organic vehicle; adding a metal precursor-containing aqueous solution to the organic vehicle to form a microemulsion; and dispersing a carbon nanotube into the organic vehicle to form the paste composition.

The method may include sintering the paste composition within a temperature range of about 400° C. to about 1200° C.

According to an aspect of another embodiment, a method of preparing a planar heating element includes: coating the paste composition on a substrate; and sintering the paste composition within a temperature range of about 400° C. to about 1200° C. to prepare the planar heating element.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
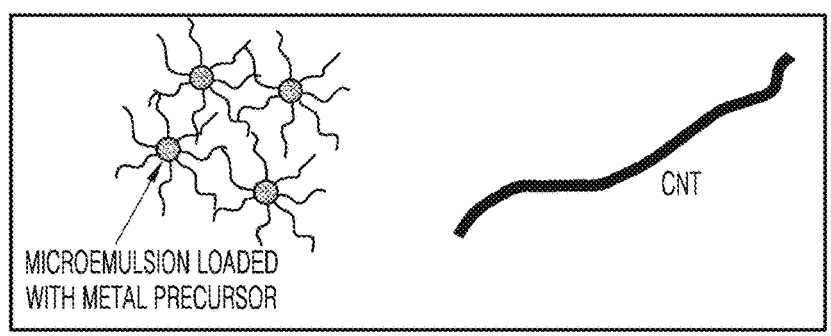
FIG. 1 is a schematic view illustrating the preparation of a paste composition according to an embodiment.
Figure 1:
Figure 1:
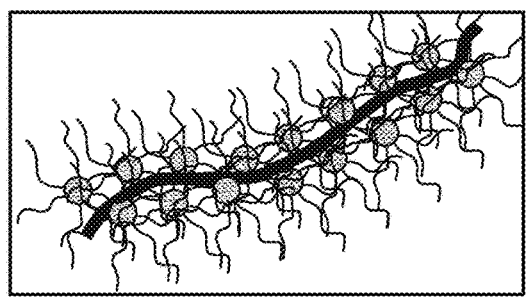
Figure 1:
Figure 1:
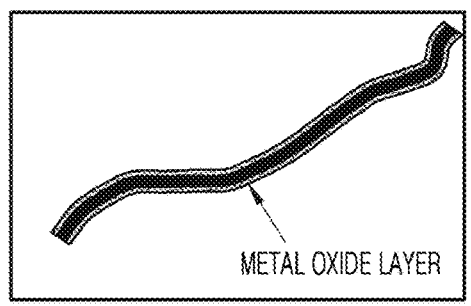

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising" will be understood to imply the inclusion of stated elements but not the exclusion of any other elements.

Further, the singular includes the plural unless mentioned otherwise.

In the drawings, the thickness of layers, films, panels, regions, etc., are exaggerated for clarity. Similar reference numerals designate similar elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

The term "alkyl" refers to fully saturated branched or unbranched (or straight chain or linear) hydrocarbon groups. Non-limiting examples of an alkyl group include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

The term "alkyl amine" refers to an amine or an amino group substituted by one or more alkyl groups.

The term "alkyl amide" refers to an amide or an amide group substituted by one or more alkyl groups.

The term "alkyl amine oxide" refers to an amine oxide or an amine oxide group substituted by one or more alkyl groups.

The term "alkyl ammonium" refers to an ammonium cation or a cationic ammonium group substituted by one or more alkyl groups.

The term "cycloalkyl" refers to a monovalent group having one or more saturated rings in which all ring members are carbon (e.g., cyclopentyl and cyclohexyl).

The term "heterocycloalkyl" refers to a cycloalkyl group including at least one heteroatom selected from N, O, P, Si, and S in a ring thereof.

The term "halogen" includes fluorine, bromine, chlorine, or iodine. The term "halide" includes fluoride, bromide, chloride, or iodide.

The term "alkoxy" refers to alkyl-O—, and the alkyl group is the same as defined above. Non-limiting examples of an alkoxy group include methoxy, ethoxy, propoxy, 2-propoxy, butoxy, tert-butoxy, pentyloxy, hexyloxy, cyclopropoxy, and cyclohexyloxy.

The term "aryl" refers to an aromatic hydrocarbon system containing one or more rings. Non-limiting examples of the aryl group include phenyl, naphthyl, and tetrahydronaphthyl.

The term "heteroaryl" refers to a monocyclic or bicyclic organic compound that includes at least one heteroatom selected from N, O, P, Si, and S, and the remaining ring atoms are C. For example, the heteroaryl group may include 1 to 5 heteroatoms and may include 5 to 10 ring members, wherein S and N may be oxidized to various oxidation states.

The term "heteroaryl" also refers to a group in which a heteroaromatic ring is fused to one or more aryl, cycloalkyl, or heterocycloalkyl rings.

The term "heteroaryloxy" refers to heteroaryl-O—, and the heteroaryl group is as described above.

The terms "alkylene," "arylene," "heteroarylene," "cycloalkylene," and "heterocycloalkylene" refer to substituents in which one hydrogen atom of an alkyl group, an aryl group, a heteroaryl group, a cycloalkyl group, or a heterocycloalkyl group is substituted with a bond.

It is to be understood that any of the foregoing groups or compounds described herein may be unsubstituted or substituted, provided that any such substituent does not substantially adversely affect the manufacture or use of the compound. For example, as would be understood by one of ordinary skill in the art, a nonionic surfactant would not be substituted with an anionic or cationic group. When a group or compound is substituted, at least one (e.g., 1, 2, 3, 4, 5, 6, or more) hydrogens are replaced with at least one of a C1 to C30 alkyl group, a C2 to C30 alkenyl or alkynyl group, a C6 to C30 aryl group, a C7 to C30 alkylarylene group, a C7 to C30 arylalkylene group, a C1 to C30 alkoxy group, a C1 to C30 heteroalkyl group, a C4 to C30 heteroalkylarylene group, a C3 to C8 cycloalkyl group, a C3 to C8 cycloalkenyl group, a C6 to C8 cycloalkynyl group, a C2 to C10 heterocycloalkyl group, a halogen, a hydroxy group (—OH), a nitro group (—NO$_2$), a cyano group (—CN), an amino group (—NRR', wherein R and R' are independently hydrogen or a C1 to C6 alkyl group), an azido group (—N$_3$), an amidino group (—C(=NH)NH$_2$), a hydrazino group (—NHNH$_2$), a hydrazono group (=N(NH$_2$), an aldehyde group (—C(=O)H), a carbamoyl group (—C(O)NH$_2$), a thiol group (—SH), an ester group (—C(═O)OR, wherein R is a C1 to C6 alkyl group or a C6 to C12 aryl group), a carboxyl group (—COOH) or a salt thereof (—C(═O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), or a combination including at least one of the foregoing, provided that the substituted atom's normal valence is not exceeded.

Carbon black and carbon fibers have excellent far infrared emission characteristics and can be used to provide a heating element, such as a planar heating element, by weaving carbon fibers. Carbon is highly heat resistant, has high durability, high heat conductivity, low thermal expansion coefficient, and is lightweight. Also, a composite manufacturing process may be easier when carbon is used compared to etching a metallic heating element, and the cost of carbon is relatively low.

In the case of metallic or carbon-based filler, which can be used as a filler of a planar heating element, oxidation caused by reaction with oxygen may occur as a temperature increases. That is, an oxidation product may be formed by oxidation in the case of a metal, and may degrade to form CO gas, which causes changes in the electrical conducting properties, and thus the characteristics of the heating element may be modified. In this regard, a planar heating element including a metallic or carbon-based filler is limited to use in a low-temperature type device, e.g., a residential heating device.

In order to manufacture a planar heating element that may be used in a high-temperature environment, such as for pyrolytic self-cleaning, and to address the limitations described above, an electrically conductive filler capable of maintaining oxidation resistance at a high temperature (e.g., 400° C. or higher) is needed.

According to an aspect of an embodiment of the present disclosure, a paste composition improves oxidation resistance of a carbon nanotube. The paste composition includes a carbon nanotube and an organic vehicle, wherein a microemulsion including a metal precursor and a surfactant is adsorbed on a surface of the carbon nanotube.

FIG. 1 is a schematic view illustrating a paste composition according to an embodiment.

As shown in FIG. 1, when a carbon nanotube (CNT) is added to and mixed in a microemulsion including a metal precursor dispersed in an organic vehicle, the paste composition may have the microemulsion adsorbed on a surface of the carbon nanotube. In an exemplary embodiment, the microemulsion is adsorbed on an exterior surface of the carbon nanotube.

The microemulsion may have a spherical reverse micelle structure in which hydrophilic head parts of the surfactant agglomerate around the metal precursor and hydrophobic tail parts of the surfactant extend from, e.g., flare out from, the organic vehicle. The microemulsion may be adsorbed on a surface of the carbon nanotube by hydrophobic and electrostatic attraction force.

In the paste composition, the surface of the carbon nanotube is absorbed with the microemulsion, and thus a passivation layer of a metal oxide may be simultaneously formed on the surface of the carbon nanotube as the metal precursor oxidizes during a sintering process.

A carbon nanotube can degrade at a temperature of about 400° C. or greater, and such degradation changes the electrical conductivity of the carbon nanotube, and thus the electrical properties of a heating element comprising a carbon nanotube may be degraded if heated to about 400° C. or greater. However, the paste composition according to an embodiment forms a passivation layer of a metal oxide on a surface of the carbon nanotube as the metal precursor in the microemulsion oxidizes, wherein the microemulsion is adsorbed on the surface of the carbon nanotube, during a sintering process, and thus conductive paths via the carbon nanotube may be protected, oxidation resistance of the carbon nanotube may be maintained, and the carbon nanotube may be sintered at a high temperature without substantial degradation.

Therefore, the paste composition may substitute for a complicated technique for coating a surface of carbon nanotube that would otherwise be used to avoid degradation. For example, a surface of a carbon nanotube has been surface-coated by undergoing a hydrophilic treatment and a coupling process. In contrast, the paste composition enables formation of a passivation layer on a surface of a carbon nanotube using only a sintering process when a microemulsion including a metal precursor is adsorbed on the surface of the carbon nanotube, and thus a complicated coating process can be avoided.

Further, the paste composition may be sintered at a high temperature. For example, the paste composition may be sintered at a temperature of about 400° C. or greater without causing degradation of the carbon nanotube. The paste composition may be sintered within a temperature range of about 400° C. to about 1200° C.

Hereinafter, features of the paste composition will be further disclosed.

Since a length/diameter ratio of the carbon nanotube included in the paste composition is high, conductive paths may be formed by the carbon nanotube, which is 3-dimensionally and homogenously dispersed in the heating element, and thus percolation may be manifested by the rapid increase in an electrical conductivity when the carbon nanotube is contained in a small amount. Therefore, the carbon nanotube has a low percolation threshold and may decrease a percolation threshold when an electrical conductive filler in the form of particles is used.

The carbon nanotube may be any suitable type of a carbon nanotube, for example, a single-walled carbon nanotube, a double-walled nanotube, a multi-walled carbon nanotube, or a bundled carbon nanotube, and which may be used alone or in combination of at least two thereof. For example, a multi-walled carbon nanotube may be used in an economical aspect.

A single-walled carbon nanotube may have semiconducting or metallic properties depending on the chirality characteristics, while a multi-walled carbon nanotube does not have distinctive chirality characteristics, and thus may be suitable to be used as a conductive filler in a composite material. Also, the carbon nanotube is an excellent nano material having high mechanical strength, thermal conductivity, and chemical stability. A heat capacity per unit volume of the carbon nanotube is about 0.9 Joules per cubic centimeter-Kelvin (J/cm$^3$·K), and this is less than a heat capacity of an alternative conductive filler material, for example, a heat capacity per unit volume of stainless steel is about 3.6 J/cm$^3$·K. Since a thermal conductivity of the carbon nanotube is 3,000 Watts per meter-Kelvin (W/m·K) or greater, a temperature increasing efficiency of the carbon nanotube is significantly better than that of an alternative conductive filler material.

A microemulsion including a metal precursor and a surfactant can be adsorbed on a surface of the carbon nanotube. The microemulsion allows the carbon nanotube and the metal precursor to be homogenously dispersed in an organic vehicle and forms a passivation layer of a metal oxide on the surface of the carbon nanotube during a sintering process so that an oxidation resistance of the carbon nanotube may be maintained even during a high-temperature sintering process.

The microemulsion may have a reverse micelle structure, in which the surfactant surrounds the metal precursor. For example, by using a lipophilic surfactant, the microemulsion may be prepared as a water-in-oil (W/O) type, in which the metal precursor is encapsulated in a micelle, so that the hydrophilic metal precursor can be dispersed in the organic vehicle.

A method of preparing the microemulsion is not particularly limited. For example, after a surfactant capable of forming a reverse micelle is dispersed in an organic vehicle to form a reverse micelle, a metal precursor dissolved in a water-based solvent is added thereto, and then a microemulsion, which is thermally stable and transparent, may be obtained.

The metal precursor contains a metal capable of forming a passivation layer on the surface of the carbon nanotube through a sintering process. For example, the metal precursor can be a metal capable of forming a passivation layer, which may be a metal salt, including at least one selected from aluminum (Al), silicon (Si), magnesium (Mg), zirconium (Zr), tungsten (W), zinc (Zn), titanium (Ti), chrome (Cr), manganese (Mn), bismuth (Bi), tellurium (TI), niobium (Nb), hafnium (Hf), indium (In), tin (Sn), copper (Cu), cobalt (Co), lead (Pb), iron (Fe), molybdenum (Mo), nickel (Ni), and an alloy thereof, i.e., a combination comprising one or more of the foregoing metals, or a combination comprising one or more of the foregoing metals and a metal not named.

Examples of the metal salt may include at least one selected from a halide, a C2 to C9 carboxylate, a C1 to C9 sulfonate, a cyanide, a hydroxide, an oxy-hydroxide, an alkoxide, e.g., a C1 to C32 alkoxide, a sulfate, a nitrate, and a carbonate.

The metal precursor may be used in an aqueous phase, which includes water. The aqueous metal precursor may easily form a water-in-oil (W/O) microemulsion in an organic vehicle.

An amount of the metal precursor may be in a range of about 0.1 part by weight to about 200 parts by weight, based on 100 parts by weight of the carbon nanotubes. In some embodiments, an amount of the metal precursor may be in a range of about 1 part by weight to about 100 parts by weight, or, for example, about 10 parts by weight to about 50 parts by weight, or, about 20 parts by weight to about 50 parts by weight, based on 100 parts by weight of the carbon nanotube. When the amount of the metal precursor is within these ranges, a suitable passivation layer may be formed on surfaces of the carbon nanotubes after a sintering process.

The surfactant included in the microemulsion may be at least one of a cationic surfactant, an anionic surfactant, a non-ionic surfactant, and an amphoteric surfactant, which may be used alone or in a combination, e.g., as a mixture of different surfactants, or of different surfactants of the similar type (e.g., two different anionic surfactants).

Examples of the cationic surfactant may include at least one selected from a (C8-C22 alkyl) trimethyl ammonium halide, preferably, a C8-C22 alkyl trimethyl ammonium chloride; a C8-C22 alkyl dimethyl benzyl ammonium halide, or a di(C8-C22 alkyl)dimethyl ammonium halide (wherein, a C8-C22 alkyl group is, for example, octyl, decyl, dodecyl, hexadecyl, oleyl, or octadecyl alkyl group, e.g., a tallow, soya, or coco alkyl group), a salt corresponding thereto, a fat amine, fatty acid amine, and a derivative thereof, a basic pyridinium-containing compound, a quaternary ammonium base group of benzimidazoline, and a quaternary ammonium salt such as poly(ethoxylated/propoxylated) amine. Methosulfate, phosphate, or acetate may be used as alternatives for the halide ion.

Examples of the cationic surfactant may include at least one selected from dodecyltrimethyl ammonium bromide, tetradecyltrimethyl ammonium bromide, cetyltrimethyl ammonium bromide, cetyldimethylethyl ammonium bromide, a C1 to C30 alkyl-trimethyl-ammonium bromide, a C1 to C30 alkylamine, a C1 to C30 heterocycloalkyl such as a (C1 to C30 alkyl) imidazoline, an ethoxylated amine such as a C1 to C30 alkyl ethoxy amine, a quaternary compound (e.g., a phosphonium or ammonium salt), a quaternary ester (also known in the art as an "ester-quat", such as the ester-quats described in U.S. Pat. No. 5,916,863 and the references cited therein), a (C1 to C30 alkyl)amine oxide, lauramine oxide, dicetyldimonium chloride, cetrimonium chloride, a primary polyethoxylated fatty amine salt, a secondary polyethoxylated fatty amine salt, a tertiary polyethoxylated fatty amine salt, a quaternary ammonium salts such as a tetra(C1 to C30 alkyl)ammonium halide, a (C1 to C30 alkyl)amide-(C1 to C30 alkyl)ammonium halide, a tri(C1 to C30 alkyl)benzylammonium, a tri(C1 to C30 alkyl)hydroxy-C1 to C30-alkyl)ammonium halide, a (C1-C30 alkyl)pyridinium chloride, a (C1-C30 alkyl)pyridinium bromide, an imidazoline derivative, and a cationic amine oxide.

Examples of the anionic surfactant may include a (C1 to C30 alkyl) sulfate such as lauryl sulfate, an acrylic polymer, which includes homopolymers and copolymers of acrylic acid and (C10 to C30 alkyl) acrylate or (C10 to C30 alkyl) methacrylate units that can be optionally cross-linked, such as the CARBOPOL, PEMULEN, and NOVEON polymers from Lubrizol, a (C6 to C20 alkyl) benzenesulfonic acid and a salt thereof, a sulfate ester of (C1 to C30 monoalkyl) polyoxyethylene ether, a sulfonated glyceryl ester of a fatty acid, a salt of a sulfonated monovalent alcohol ester, an amide of an amino sulfonic acid, a sulfonated product of a fatty acid nitrile, a condensate of naphthalene sulfonic acid and formaldehyde, an alkali metal alkyl sulfate, an alkali metal ester sulfate, a (C6 to C30 alkyl) phosphate, a (C6 to C30 alkyl) sarcosinate, and a C6 to C30 sulfonated olefin.

In an embodiment, the anionic surfactant may be at least one selected from sodium dodecyl sulfate, a (C6 to C30 alkyl)benzene sulfonate, a C6 t C30 alpha olefin sulfonate, a paraffin sulfonate, a C6 to C30 alkyl ester sulfonate, a C6 to C30 alkyl sulfate, a (C6 to C30 alkyl alkoxy) sulfate, a (C6 to C30 alkyl) sulfonate, a (C6 to C30 alkyl alkoxy) carboxylate, a (C6 to C30 alkyl alkoxylate) sulfate, a (C6 to C30 monoalkyl)(ether) phosphate, a C1 to C30 dialkyl (ether) phosphate, a (C6 to C30 alkyl) sarcosinate, sulfosuccinate, sodium bis(2-ethylhexyl) sulfosuccinate, ethoxylate 4-nonylphenyl ether glycolic acid, isethionate, taurate, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium lauryl phosphate, sodium tridecyl phosphate, sodium behenyl phosphate, sodium laureth-2 phosphate, sodium ceteth-3 phosphate, sodium trideceth-4 phosphate, sodium dilauryl phosphate, sodium ditridecyl phosphate, sodium ditrideceth-6 phosphate, sodium lauroyl sarcosinate, lauroyl sarcosine, cocoyl sarcosine, ammonium cocoyl sulfate, sodium cocoyl sulfate, sodium trideceth sulfate, sodium tridecyl sulfate, ammonium trideceth sulfate, ammonium tridecyl sulfate, sodium cocoyl isethionate, disodium laureth sulfosuccinate, sodium methyl oleoyl taurate, sodium laureth carboxylate, sodium trideceth carboxylate, sodium lauryl sulfate, potassium cocoyl sulfate, potassium lauryl sulfate, monoethanolamine cocoyl sulfate, sodium tridecyl benzene sulfonate, sodium dodecyl benzene sulfonate, or sodium dodecyl sulfate.

Examples of the non-ionic surfactant may include a C9 to C22, in particular C12 to C14 alkyl ether of a polyethylene glycol, a polyoxy(C1 to C3 alkylene) sorbitan ether, a polyoxy(C1 to C3 alkylene) (C1 to C30 alkoxylate) ester, polyoxy(C1 to C3 alkylene) (C1 to C30 alkyl)phenol ether, ethylene oxide propylene oxide copolymer, polyvinyl alcohol, glyceride ester, and a polyoxy(C1 to C3 alkylene) alkyl ether such as a C1 to C30 alkyl) polysaccharide.

In an embodiment, examples of the non-ionic surfactant may include at least one of a C6 to C18 aliphatic primary or secondary linear or branched alcohol or a (C6 to C18 alkyl) phenol, a (C6 to C18 alkyl) ethoxylate, a (C6 to C18 alkyl) phenol (C1 to C3 alkoxylate), a block oxy(C1 to C3 alkylene) condensate of a C6 to C18 alkyl phenol), an oxy (C1 to C3 alkylene) condensate of a C1 to C18 alkanol, an oxyethylene/oxypropylene block copolymer, a semi-polar nonionic material (for example, an amine oxide such as alkylamine oxide having 8 to 50 carbon atom, and a phosphine oxide, for example each having an alkyl or hydroxyalkyl moiety of 8 to 26 carbon atoms, preferably 8 to 16 carbon atoms and two moieties that can be alkyl groups or hydroxyalkyl groups containing 1 to 3 carbon atoms, for example dimethyloctylamine oxide, diethyldecylamine oxide, bis-(2-hydroxyethyl)dodecylamine oxide, dimethyldodecylamine oxide, dipropyltetradecylamine oxide, methylethylhexadecylamine oxide, and dimethyl-2-hydroxyoctadecylamine oxide), a mono or a di(C6 to C30 alkyl) alkanolamide, a (C8 to C30 alkyl) polysaccharide, sorbitan fatty acid ester, polyoxyethylene sorbitan fatty acid ester, polyoxyethylene sorbitol ester, polyoxyethylenic acid, polyoxyethylene alcohol, coco mono or diethanolamide, coco diglycoside, a (C8 to C30 alkyl) polyglycoside, cocamidopropyl, lauramine oxide, a polyoxyethylene (20) sorbitan monolaurate such as Polysorbate 20, an ethoxylated linear C8 to C30 alcohol, cetearyl alcohol, lanolin alcohol, stearic acid, glyceryl stearate, PEG-100 stearate, 4-(1,1,3,3-tetramethylbutyl)phenyl polyethylene glycol such as the commercial products Oleth 20 TX-100 (Trion X-100), polyoxyethylene [10] cetyl ether such as the commercial product Brij 56 ($C_{16}EO_{10}$), eicosaethylene glycol octadecyl ether such as the commercial product Brij 78 ($C_{18}EO_{20}$), and HO($CH_2$ $CH_2O)_{20}(CH_2CH(CH_3)O)_{70}(CH_2CH_2O)_{20}H$ such as the BASF triblock copolymers based on poly(ethylene glycol)-poly(propylene glycol)-poly(ethylene glycol) such as Pluronic P123 ($EO_{20}PO_{70}EO_{20}$).

Examples of the amphoteric surfactant may include at least one selected from cocamidopropyl betaine, cocamidopropyl hydroxyl sulfate, coco-betaine, sodium cocoamidoacetate, cocodimethyl betaine, N-coco-3-aminobutyric acid, and an imidazolinium carboxyl compound.

An amount of the surfactant may be in a range of about 50 parts by weight to about 10,000 parts by weight, based on 100 parts by weight of the metal precursor. For example, an amount of the surfactant may be in a range of about 100 parts by weight to about 5,000 parts by weight, or, for example, about 200 parts by weight to about 1,000 parts by weight, or about 300 parts by weight to about 500 parts by weight, based on 100 parts by weight of the metal precursor. Without being bound by theory, when the amount of the surfactant is within these ranges, a microemulsion loaded with a metal precursor may be formed, and thus the microemulsion may be adsorbed on the surface of the carbon nanotube.

In the paste composition, the carbon nanotube includes an organic vehicle. Without being bound by theory, the organic vehicle acts as the medium that disperses the carbon nanotube and the microemulsion so that the microemulsion may be homogenously adsorbed on the surface of the carbon nanotube. The organic vehicle may be selected to control the viscosity of the paste composition, and the organic vehicle may also be selected to provide desirable rheological characteristics to the microemulsion.

The organic vehicle may include at least one selected from an organic solvent and an organic binder.

The organic solvent disperses the microemulsion and the carbon nanotube and influences the viscosity of the paste composition.

Examples of the organic solvent may include at least one selected from acetone, acetylacetone, methylethyl ketone, methyl alcohol, ethyl alcohol, isopropyl alcohol, butyl alcohol, octanol, 2,2,4-trimethyl-1,3-pentanediol monoisobutyrate such as the Eastman Chemical product Texanol™, ethylene glycol, polyethylene glycol, tetrahydrofuran, 1,2-butoxy ethane, dimethyl formamide, dimethyl acetamide, N-methyl-2-pyrrolidone, hexane, cyclohexanone, toluene, xylene, chloroform, dichlorobenzene, dimethylbenzene, trimethylbenzene, pyridine, methylnaphthalene, nitromethane, acrylonitrile, octadecylamine, aniline, dimethyl sulfoxide, diethylene glycol ethylether, ethyl acetate, butyl acetate, butyl carbitol acetate (BCA), propylene glycol monomethyl ether acetate (PGMEA), diethylene glycol monobutyl ether, terpineol, 2-phenoxy ethanol, butyl carbitol acetate, butyl carbitol, propylene glycol monomethylether, dipropylene glycol monomethylether, propylene glycol monomethylether propionate, ethylether propionate, gamma-butyrolactone, ethyl lactate, methyl cellosolve, ethyl cellosolve, butyl cellosolve, ethylene glycol, ethylene glycol monobutyl ether, cellosolve acetate, and butyl cellosolve acetate.

The organic binder gives attachment among element compositions of the paste composition and adhesion of the paste composition to a substrate.

Examples of the organic binder may include at least one selected from a cellulose polymer, an acrylic polymer, a styrene polymer, a polyvinyl resin, a (C1 to C6 alkyl) methacrylate ester polymer, a (C1 to C6 alkyl) acrylate ester polymer, a styrene-acrylate ester copolymer, a polystyrene, polyvinyl butyral, a polyvinyl alcohol, a polyethylene oxide, a polypropylene carbonate, a polymethylmethacrylate, an ammonium acrylate, Arabic Gum, a gelatin, an alkyd resin, a butyral resin, a saturated polyester, a natural rubber, a silicone rubber, a fluorosilicone, a fluoroelastomer, a synthetic rubber, and copolymers thereof.

For example, the organic binder may comprise at least one selected from a cellulose polymer such as ethylcellulose, hydroxyethylcellulose, hydroxypropyl cellulose, and hydroxyethylhydroxypropylcellulose, an acrylic polymer, which includes a copolymer such as a copolymer prepared by copolymerizing a hydrophilic acryl monomer, such as a monomer including a carboxylic group, or a polyvinyl-based resin, which may be used alone or in combination of at least two thereof, but embodiments are not limited thereto.

The organic vehicle may be a solution mixture prepared by dissolving an organic binder in an organic solvent. The organic vehicle may include, for example, about 5 weight percent (wt %) to about 40 wt % of the organic binder and about 60 wt % to about 95 wt % of the organic solvent, based on a total weight of the organic vehicle. In some embodiments, the organic vehicle may include, for example, about 10 wt % to about 30 wt % of the organic binder and about 70 wt % to about 90 wt % of the organic solvent. When the organic vehicle includes the organic binder and the organic solvent within these ranges, the paste composition may maintain homogenous dispersibility, have desirable coating properties, and also have increased binding strength.

An amount of the organic vehicle may be, but not particularly limited to, in a range of about 1 part by weight to about 10,000 parts by weight, based on 100 parts by weight of the carbon nanotube. For example, an amount of the organic vehicle may be in a range of about 1 part by weight to about 1,000 parts by weight, or, for example, about 10 parts by weight to about 1,000 parts by weight, or about 10 parts by weight to about 500 parts by weight, based on 100 parts by weight of the carbon nanotube. When the amount of the organic vehicle is within these ranges, the carbon nanotube may be homogeneously dispersed in the paste composition and a viscosity of the paste composition may be appropriately controlled.

The paste composition may further include at least one selected from a metallic filler, a glass frit, and an enamel frit.

Figure 2:
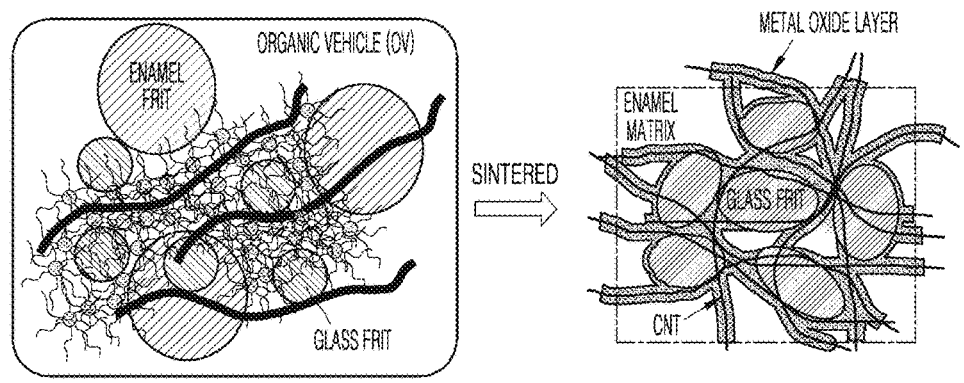
FIG. 2 is a schematic view illustrating a paste composition according to an embodiment and an embodiment of a sintering process.

FIG. 2 illustrates an example of the paste composition. As shown in FIG. 2, when the paste composition includes at least one selected from a metallic filler, a glass frit, or an enamel frit, the glass frit or the enamel frit melts after a sintering process and forms a matrix, and the carbon nanotube, on which a passivation layer of a metal oxide is formed at the same time with the sintering, and the metallic filler may be in the state which are dispersed in the matrix.

The metallic filler may improve an electric conductivity of the paste composition.

The metallic filler may include, for example, at least one metal selected from gold (Au), silver (Ag), platinum (Pt), ruthenium (Ru), iridium (Ir), aluminum (Al), copper (Cu), cobalt (Co), nickel (Ni), tin (Sn), zinc (Zn), molybdenum (Mo), manganese (Mn), zirconium (Zr), iron (Fe), tungsten (W), and an alloy thereof. The metallic filler may have a nanostructure such as a nanoparticle, a nanowire, or a nanorod.

The metallic filler may include an amorphous metal. The amorphous metal may be an alloy including, but not limited to, at least one selected from Al, Cu, Ni, Mg, Mn, Ca, Zr, Fe, and Ti. Examples of an amorphous metal with a high electric conductivity may be an alloy having, for example, Al, Cu, Ni, or Ti as a primary component.

The glass frit or enamel frit may increase a strength of a device when the past composition is used in a heating device or various display devices, in addition to serving as a matrix that disperses the carbon nanotubes having a passivation layer formed thereon.

For example, the glass frit may include at least one selected from zinc oxide (ZnO), silicon oxide ($SiO_2$), boron oxide ($B_2O_3$), bismuth oxide ($Bi_2O_3$), aluminum oxide ($Al_2O_3$), lithium oxide ($Li_2O$), sodium oxide ($Na_2O$), potassium oxide ($K_2O$), titanium oxide ($TiO_2$), manganese oxide (MnO), cobalt oxide (CoO), nickel oxide (NiO), copper oxide (CuO), and zirconium oxide ($ZrO_2$).

In some embodiments, the glass frit may include at least one selected from a zinc oxide-silicon oxide ($ZnO$—$SiO_2$)-based compound, a zinc oxide-boron oxide-silicon oxide ($ZnO$—$B_2O_3$—$SiO_2$)-based compound, a boron oxide-sodium oxide-silicon oxide ($B_2O_3$—$Na_2O$—$SiO_2$)-based compound, a zinc oxide-boron oxide-silicon oxide-aluminum oxide ($ZnO$—$B_2O_3$—$SiO_2$—$Al_2O_3$)-based compound, a bismuth oxide-silicon oxide ($Bi_2O_3$—$SiO_2$)-based compound, a bismuth oxide-boron oxide-silicon oxide ($Bi_2O_3$—$B_2O_3$—$SiO_2$)-based compound, a bismuth oxide-boron oxide-silicon oxide-aluminum oxide ($Bi_2O_3$—$B_2O_3$—$SiO_2$—$Al_2O_3$)-based compound, a bismuth oxide-zinc oxide-boron oxide-silicon oxide ($Bi_2O_3$—$ZnO$—$B_2O_3$—$SiO_2$)-based compound, and a bismuth oxide-zinc oxide-boron oxide-silicon oxide-aluminum oxide ($Bi_2O_3$—$ZnO$—$B_2O_3$—$SiO_2$—$Al_2O_3$)-based compound.

The enamel frit has a low melting temperature range, and a low melting viscosity, which may typically include a glass frit and may further include at least one inorganic pigment. The enamel frit may be any suitable material available as an enamel frit in the art.

The paste composition may further include an inorganic filler that may serve to improve heat-resistance, electric conductivity, and/or mechanical strength of the paste composition. Examples of the inorganic filler may include, but are not limited to, calcium carbonate, magnesium carbonate, calcium sulfate, magnesium sulfate, iron oxide, zinc oxide, magnesium oxide, aluminum oxide, calcium oxide, titanium oxide, calcium hydroxide, magnesium hydroxide, aluminum hydroxide, amorphous silica, fumed silica, synthetic silica, natural zeolite, synthetic zeolite, bentonite, activated clay, talc, kaolin, mica, diatomite, and clay. These compounds may be used alone or in combination of at least two thereof.

Also, the paste composition may be mixed with an appropriate additive, if desired, within the range that does not impairing a heating effect, for example, an oxidation-resistant stabilizer, a weather-resistant stabilizer, an anti-static agent, a dye, a pigment, a dispersing agent, or a coupling agent.

The paste composition may have a range of viscosities that is appropriate to be sprayed without clogging nozzles, but is not specifically limited. For example, the viscosity may be from about 10 seconds to about 30 seconds (#4 Ford Cup), which is appropriate for the paste composition to be sprayed. However, when using a special spray gun, an amount of the organic vehicle may be increased or reduced if an arbitrary viscosity adjustment is desired.

The paste composition may be used as a heating material and may be used in various devices such as semiconductor devices, touch sensors, gas barriers, and CNT gas sensors.

For example, the paste composition may be used to prepare a heating element with improved oxidation resistance at a high temperature. Thus the paste composition may be used as a material in a plate heater of an electric oven which requires high heat-resistance, a printable ink material for a fixing device, a high heat-resistant and high-strength material for aerospace industry, a resistor material of a rear layer in the field of semiconductor, a material for microprocessor in a computer, a material for an optical sensor, or a medical diagnostic device such as an X-ray, ultrasound, or MRI system.

Hereinafter, a method of manufacturing the paste composition according to an embodiment will be further described.

The method of manufacturing the paste composition according to an embodiment includes preparing an organic vehicle in which a surfactant is dispersed; adding a metal precursor-containing aqueous solution to the organic vehicle to prepare a microemulsion; and adding and dispersing a carbon nanotube in the organic vehicle.

Figure 3:
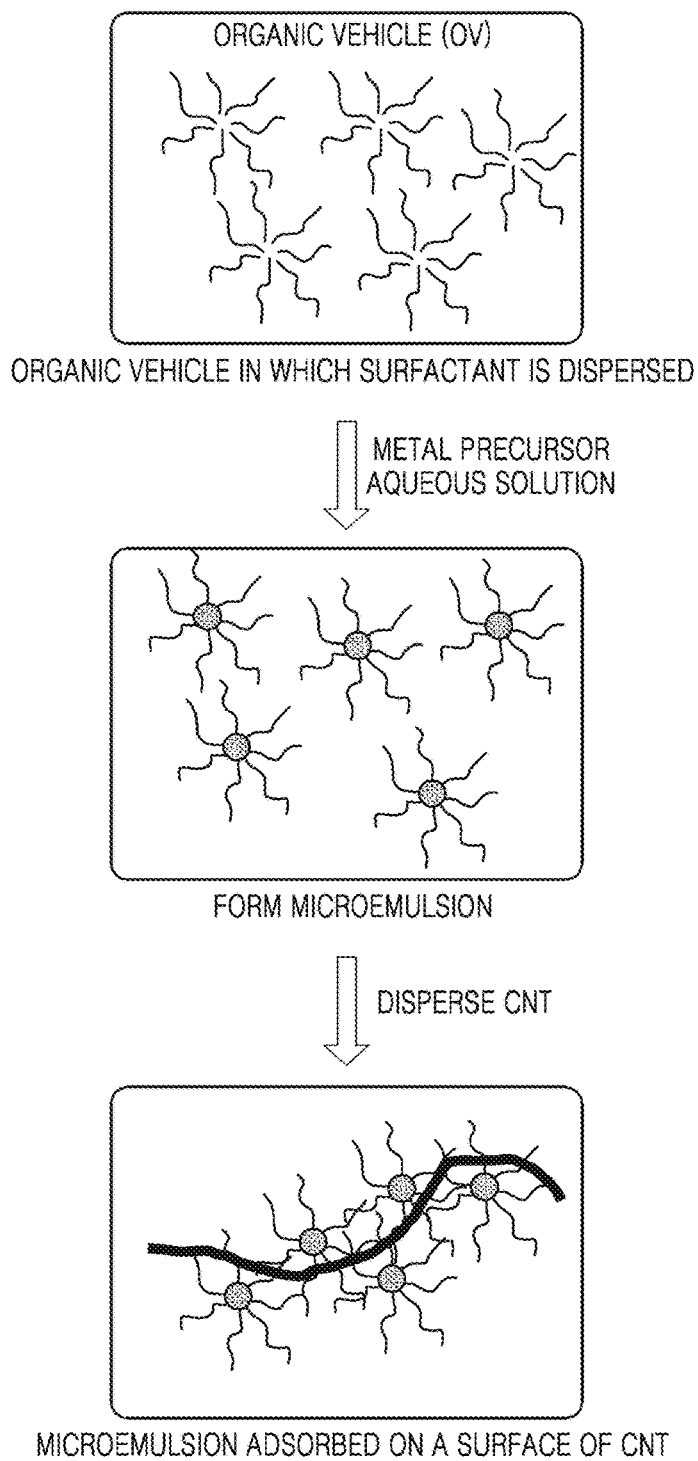
FIG. 3 is a schematic view illustrating a preparation process of a paste composition according to an embodiment.

FIG. 3 schematically illustrates the method of manufacturing the paste composition according to an embodiment.

As shown in FIG. 3, to manufacture the paste composition, an organic vehicle in which a surfactant is dispersed may be prepared. The surfactant, which may form a reverse micelle to encapsulate a precursor in a micelle, may be dispersed in the organic vehicle.

An aqueous solution containing a metal precursor is prepared, and then the metal precursor-containing aqueous solution is added to the organic vehicle. When the metal precursor is dissolved, an aqueous material is added into the organic vehicle, in which a reverse micelle is formed, the metal precursor is encapsulated in the reverse micelle, and thus a water-in-oil (W/O) type microemulsion may be formed.

In this regard, when the carbon nanotube is added and dispersed in the organic vehicle including the microemulsion loaded with the metal precursor, the microemulsion may be adsorbed on the surface of the carbon nanotube.

According to another embodiment, provided is a heating element including a sintered product of the paste composition.

The heating element includes the carbon nanotube that has a passivation layer of a metal oxide on the surface of the carbon nanotube as the microemulsion containing the metal precursor is oxidized during a sintering process.

The heating element may be manufactured, for example, using a preparation method including sintering the paste composition within a temperature range of about 400° C. to about 1200° C. The paste composition may be sintered without degradation of the carbon nanotube within such high temperature range.

The heating element according to an embodiment of the present disclosure can have any suitable shape, and can be a planar heating element. A length and a width of the heating element may each independently be at least about 10 times greater, e.g., about 10 to about 1000 times greater, or about 10 to about 500 times greater than a thickness of the heating element.

The heating element may be manufactured, for example, by using a preparation method including coating the paste composition on a substrate; and sintering the paste composition within a temperature range of about 400° C. to about 1200° C.

The substrate is a support that supports the planar heating element, and examples of the substrate may include, but are not limited to, a silicon wafer, a metal substrate, a plastic substrate, a glass fiber mat, or ceramic glass. The plastic has high heat resistance, and examples of the plastic may include polyphenylene sulfide (PPS), polyamide-imide, polyimide, polyketone, polyphthalamide (PPA), polyether-ether-ketone (PEEK), polyethersulfone (PES), or polyetherimide (PEI).

The paste composition may be coated on a substrate by using various methods, such as screen printing, ink jet, dip coating, spin coating, or spray coating.

When the substrate is coated with the paste composition, an amount of the paste composition on the substrate may be controlled so that the heating element finally obtained after the organic vehicle evaporates by the sintering process may have a predetermined thickness, and this may be repeated several times to complete the coating.

Next, the paste composition coated on the substrate may be sintered within a temperature range of about 400° C. to about 1200° C. to obtain a planar heating element on the substrate. The organic vehicle contained in the paste composition is evaporated by the sintering process, and a passivation layer of a metal oxide may be formed on the surface of the carbon nanotube as the metal precursor in the microemulsion oxidizes. The formation of the passivation layer may prevent degradation of the carbon nanotube despite a high-temperature sintering process at 400° C. or higher. The sintering temperature may be selected in consideration of a substrate material, a type of the surfactant, and a coating thickness of the composition.

The planar heating element thus obtained may have a thickness of about 20 micrometers (μm) or greater, or, for example, about 50 μm or greater, about 100 μm or greater, or about 300 μm or greater, such as about 20 μm to about 1000 μm, or about 50 μm to about 500 μm, depending on its use.

The planar heating element may consist of a planar heating element which is manufactured by sintering the paste composition, and a substrate; or may consist of a heating element only by separating the heating element from a substrate.

According to another embodiment, provided is a heating apparatus including the heating element.

The heating element may be a component of an electric oven or a printer, or, may be used in an environment that where high-heat resistance is desirable, such as in the field of aerospace or semiconductor, or in a devices for a microprocessor of a computer, an optical sensor, or a medical diagnostic instrument.

Hereinafter, an embodiment will be disclosed in further detail with reference to the following examples. These examples are not intended to limit the purpose and scope of the one or more embodiments of the present disclosure.

Example 1

1 gram (g) of ethoxylate 4-nonylphenyl ether glycolic acid as a surfactant was added to 40 milliliters (mL) of terpineol, and the solution was stirred to disperse the surfactant in the solvent for 1 hour. 0.5 g of 50 wt % tetraethylorthosilicate aqueous solution was added to the solution, and the solution was stirred for 1 hour. Then, as an electrical conducting filler, 1 g of a multi-walled carbon nanotube (MWNT, Grade NC7000 available from Nanocyl) was added to the solution, sonicated with ultrasound waves for 10 minutes, and stirred for 2 hours to obtain a paste composition.

Example 2

A paste composition was obtained in the same manner as in Example 1, except that 1.0 g of 50 wt % tetraethylorthosilicate aqueous solution was added.

Comparative Example 1

1 g of the MWNT (Grade NC7000 available from Nanocyl) was added to 40 ml of the terpineol solvent, the solution was sonicated for 10 minutes, and then stirred for 2 hours to obtain a paste composition.

Evaluation Example 1: SEM Evaluation

The paste composition of Example 1 and Comparative Example 1 were dried at 200° C. for 2 hours and each composition was then sintered at 450° C. for 2 hours.

Figure 4:
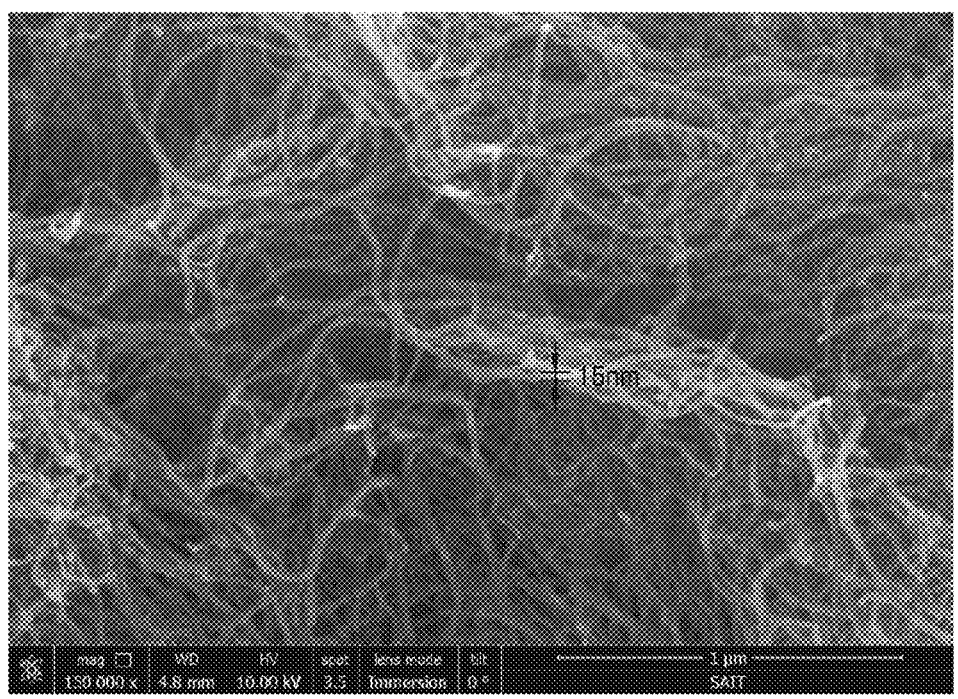
FIG. 4 is a scanning electron microscope (SEM) image of carbon nanotubes obtained after sintering a paste composition prepared in Comparative Example 1.
Figure 5:
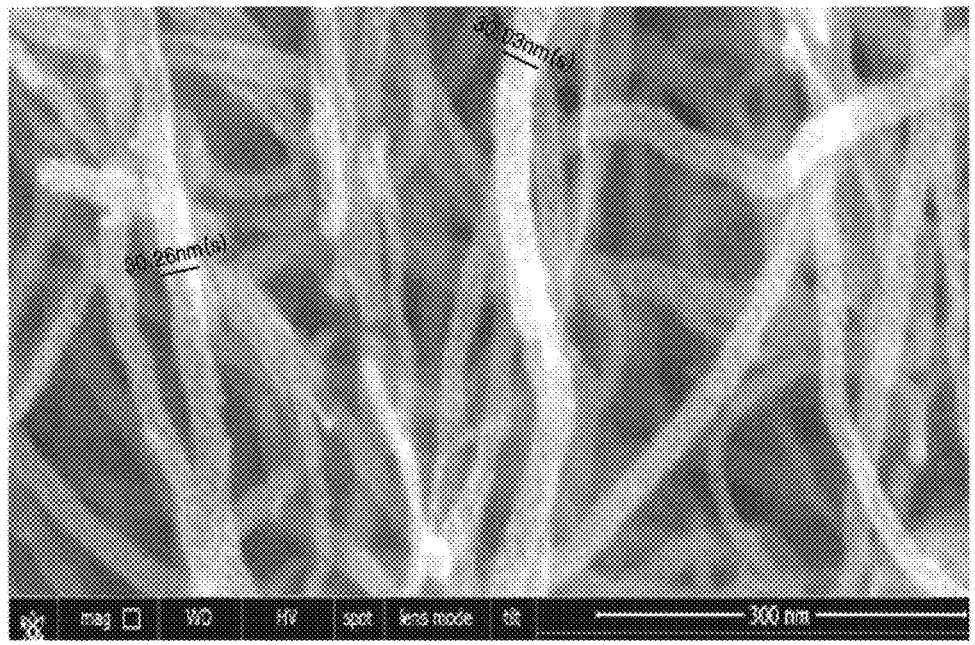
FIG. 5 is an SEM image of carbon nanotubes obtained after sintering a paste composition prepared in Example 1.

The scanning electron microscope (SEM) images, shown in FIGS. 4 and 5, are from the carbon nanotubes obtained after sintering the paste compositions of Comparative Example 1 and Example 1

As shown in FIGS. 4 and 5, a thickness of the carbon nanotube of Comparative Example 1 was 15 nanometers (nm), and no passivation layer was formed on surfaces of the carbon nanotube of Comparative Example 1. However, a thickness of the carbon nanotube of Example 1, which was sintered, increased to about 30 nm after the sintering. A passivation layer was formed on the surface of the carbon nanotube as much as the increased thickness.

Evaluation Example 2: High-Temperature Oxidation Resistance Evaluation

The paste compositions of Examples 1 and 2 and Comparative Example 1 were dried at 200° C. for 2 hours and each composition was then sintered at 450° C. for 2 hours. The high-temperature oxidation resistance properties of the resulting carbon nanotubes were evaluated, and the results are as shown in Table 1.

The high-temperature oxidation resistance was evaluated by thermal decomposition temperature ($T_d$) of the carbon nanotubes obtained after the sintering process, and was evaluated by thermogravimetric analysis (TGA, Q5000IR, TA Instruments, USA). The thermogravimetric analysis was performed under conditions including a $N_2$ atmosphere and the temperature increased from room temperature to 600° C. at a rate of 10° C./min. The results of the thermogravimetric analysis are shown in FIG. 6, and the thermal decomposition temperatures ($T_d$s) are shown in Table 1.

TABLE 1

|  | Thermal decomposition temperature ($T_d$) |
|---|---|
| Comparative Example 1 | 600° C. |
| Example 1 | 734° C. |
| Example 2 | 750° C. |

Figure 6:
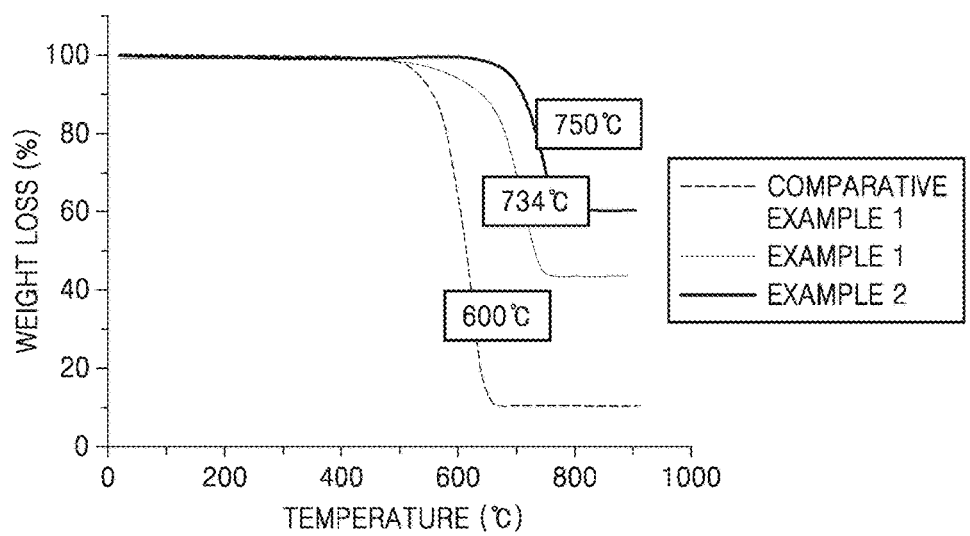
FIG. 6 is a graph of weight loss (%) versus temperature (° C.), showing the results of thermal decomposition analysis of carbon nanotubes obtained after sintering paste compositions prepared in Examples 1 and 2 and Comparative Example 1.

As shown in FIG. 6, it may be confirmed that degradation of the carbon nanotubes did not occur at temperatures of 600° C. or greater, possibly because the surfaces of the carbon nanotubes of the paste compositions of Examples 1 and 2 after high-temperature sintering process were passivated with $SiO_2$.

Also, as shown in Table 1, high-temperature oxidation resistances of the paste composition of Examples 1 and 2 increased about 130° C. or higher compared to that of the paste composition of Comparative Example 1 after the high-temperature sintering process.

Evaluation Example 3: Electrical Conductivity Evaluation

The paste composition of Example 1 was dried at 200° C. for 2 hours and then sintered at 450° C. for 2 hours. An electrical conductivity of the resultant thus obtained in the bulk state was measured, and the result was compared with an electrical conductivity of a general electrical conducting filler in the bulk state. The compared results are shown in Table 2.

TABLE 2

|  | Electrical conducting filler | Electrical conductivity (S/m) |
|---|---|---|
| Example 1 | $SiO_2$@CNT | $\sim 5 \times 10^5$ |
| Reference Example 1 | BMG ($Al_{86}Ni_6CO_2Y_6$) | $\sim 10^6$ |
| Reference Example 2 | $RuO_2$ | $\sim 2 \times 10^5$ |

As shown in Table 2, the carbon nanotubes passivated with $SiO_2$ as obtained by sintering the paste composition of Example 1 had improved electrical conductivity in the bulk state compared to those of the fillers, BMG and $RuO_2$, of Reference Examples 1 and 2.

Figure 7:
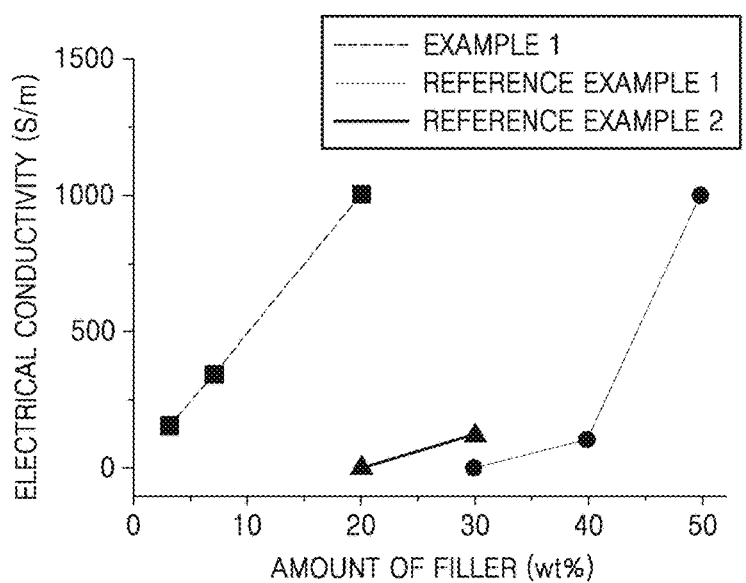
FIG. 7 is a graph of electrical conductivity (Siemens per meter, S/m) versus amount of filler (weight percent, wt %) for comparing an electrical conductivity per an amount of the carbon nanotubes obtained after sintering the paste composition of Example 1 with those of Comparative Examples 1 and 2.

Further, electrical conductivities of the paste compositions of Example 1 and Reference Examples 1 and 2 were evaluated by changing amounts of the electrical conducting fillers, and the results are shown in FIG. 7.

As shown in FIG. 7, the sintering product of Example 1 had a higher electrical conductivity with a comparably smaller amount than those of the fillers of Reference Examples 1 and 2. The carbon nanotubes passivated with $SiO_2$ obtained after sintering in the paste composition of Example 1 had an electric conductivity of 340 S/m at 7 wt % and produced a percolation effect. On the contrary, the fillers of Reference Examples 1 and 2 produced a percolation effect at a higher content but had a lower electrical conductivity than that of the paste composition prepared in Example 1.

Example 4

1 g of ethoxylate 4-nonylphenyl ether glycolic acid as a surfactant was added to 40 mL of a terpineol solvent, and the solution was stirred to disperse the surfactant in the solvent for 1 hour. 0.5 g of 50 wt % tetraethylorthosilicate aqueous solution was added to the solution, and the solution was stirred for 1 hour. Then, remaining terpineol was removed by centrifuging the solution. As an electrically conducting filler, 1 g of multi-walled carbon nanotubes (MWNT, Grade NC7000 available from Nanocyl) was added to the solution, sonicated with ultrasound waves for 10 minutes, and stirred for 2 hours. 9 g of an enamel frit (A1, available from Hae Kwang Enamel, Ind. Co., Ltd) was added to the solution, and 5 g of a mixture vehicle including ethylcellulose and terpineol (at a volume ratio of 20:80) was added thereto to control a viscosity, and thus a paste composition was prepared.

The paste composition was applied on an enamel-coated steel plate porcelain (SPP) plate, dried at 200° C. for 2 hours, and sintered at 720° C. for 20 minutes to prepare a planar heating element (having an area of 40 mm×40 mm and a thickness of 300 μm or less). An amount of carbon nanotubes based on the enamel frit in the planar heating element was about 10 wt %.

Comparative Example 4

1 g of multi-walled carbon nanotubes (MWNT, Grade NC7000 available from Nanocyl) was added to 40 ml of a terpineol solvent, sonicated with ultrasound waves for 10 minutes, and stirred for 2 hours. Then, remaining terpineol was removed by centrifuging the solution. 9 g of an enamel frit (A1, available from Hae Kwang Enamel, Ind. Co., Ltd) was added to the solution, and 5 g of a mixture vehicle including ethylcellulose and terpineol (at a volume ratio of 20:80) was added thereto, and thus a paste composition was prepared.

The paste composition was used to prepare a planar heating element in the same manner used in Example 4.

Evaluation Example 4: Electrical Conductivity Evaluation

In order to measure electrical conductivity of the planar heating element prepared in Example 4 and Comparative Example 4, a conductive silver paste was coated and dried on the planar heating element in a straight line parallel to the planar heating element, and this was cured in an oven at 100° C. to form an electrode. An electrical conductivity (S/m) was calculated by using equations below using electrical resistance values and sizes of the planar heating element. Details related to electrical conductivity measurements follow the international standard IEC Standard 93 (VDE 0303, Part 30) or ASTM D 257.

Resistivity: $\rho = R \cdot d \cdot a/b$ [$\Omega$m]

Sheet resistance($a=b$): $R_{sq}[\Omega_{sq}] => \rho = R_{sq} \cdot d$ [$\Omega$m]

Conductivity: $\sigma = 1/\rho$ [S/m]

wherein,
a: electrode length [m]
b: distance between electrodes [m],
d: film thickness [m], d<<a, b
R: resistance [Ohm]

Electrical conductivities of the planar heating element prepared in Example 4 and Comparative Example 4 thus calculated are shown in Table 3.

TABLE 3

|  | Electrical conductivity (S/m) |
|---|---|
| Comparative Example 4 | 0 |
| Example 4 | 340 |

As shown in Table 3, an electrical conductivity of the planar heating element of Comparative Example 4 appeared to be 0. The planar heating element of Comparative Example 4 did not have a passivation layer, and thus carbon nanotubes were all degraded by high-temperature sintering, and thus only an enamel frit layer was formed which exhibits an insulating property.

On the contrary, the planar heating element of Example 4 had carbon nanotubes with passivated surfaces, and thus the carbon nanotubes were not degraded after the high-temperature sintering, and had an electrical conductivity of 340 S/m.

Evaluation Example 4: SEM Evaluation

Figure 8:
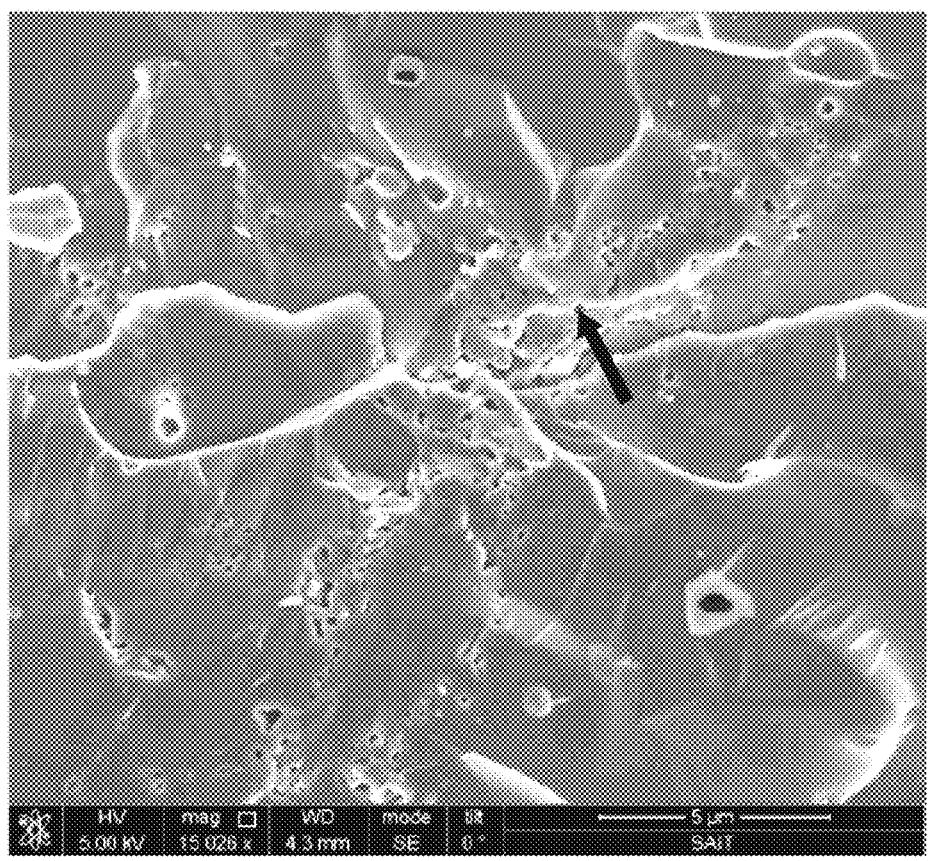
FIG. 8 is an SEM image of a planar heating element prepared in Comparative Example 4.
Figure 9A:
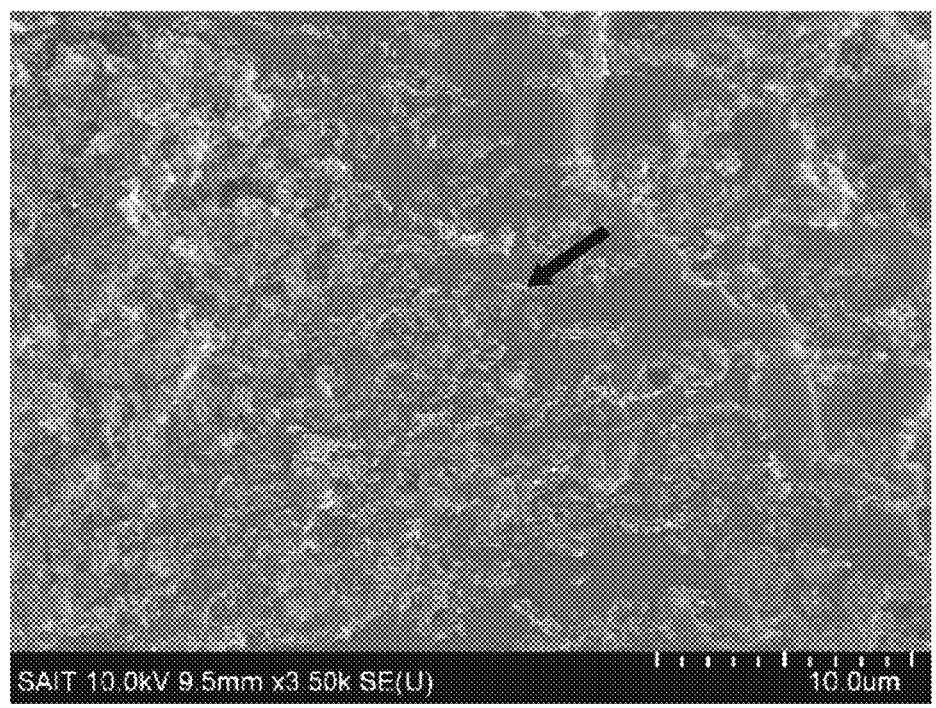
FIGS. 9A and 9B are SEM images of a planar heating element prepared in Example 4.
Figure 9B:
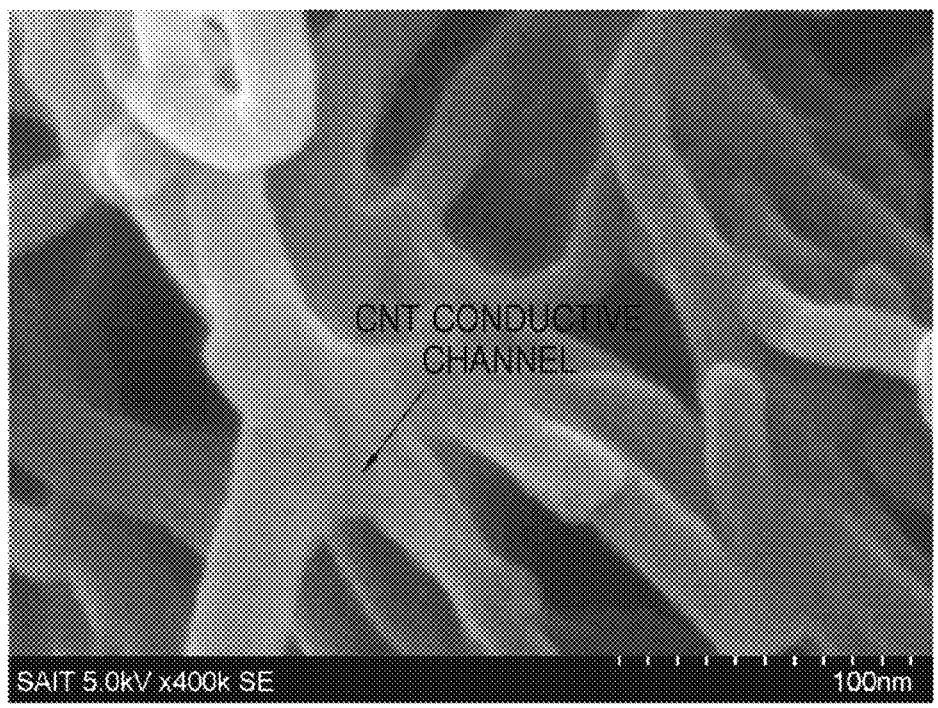

SEM images of the planar heating element of Comparative Example 4 and Example 4 are shown in FIG. 8 and FIGS. 9A and 9B.

As shown in FIG. 8, the planar heating element of Comparative Example 4 had markings consistent with the presence of carbon nanotubes, but it was observed that most of the carbon nanotubes were degraded.

On the contrary, as shown in FIGS. 9A and 9B, the planar heating element of Example 4 had the carbon nanotubes coated with SiO$_2$, and thus a passivation layer was formed thereon, and it may be known that the carbon nanotubes were not degraded and were evenly dispersed in the enamel frit. In particular, as shown in FIG. 9B, an electrical conductive network of the carbon nanotubes is present.

Example 5

1 g of a sodium bis(2-ethylhexyl) sulfosuccinate (AOT) surfactant was added to 40 mL of a mixture vehicle including ethylcellulose and terpineol (at a volume ratio of 20:80), and stirred for 1 hour to disperse the surfactant in the mixture vehicle. Next, 0.07 g of the multiwalled carbon nanotubes (MWNT) (Grade NC7000, available from Nanocyl) was added to the solution, sonicated with ultrasound waves for 10 minutes, and then stirred for 2 hours. Then, remaining terpineol was removed by centrifuging the solution. 3.5 g of an enamel frit (A1, available from Hae Kwang) was added to the solution, and 5 g of the mixture vehicle was added thereto to control a viscosity, and thus a paste composition was prepared.

The paste composition was applied on an enamel-coated steel plate porcelain (SPP) plate, dried at 200° C. for 2 hours, and sintered at 700° C. for 20 minutes to prepare a planar heating element (having an area of 40 mm×40 mm and a thickness of 300 μm or less). An amount of carbon nanotubes based on the enamel frit in the planar heating element was about 2 wt %.

Comparative Example 5

0.07 g of the MWNT (Grade NC7000, available from Nanocyl) was added to 40 mL of a mixture vehicle including ethylcellulose and terpineol (at a volume ratio of 20:80), sonicated with ultrasound waves for 10 minutes, and then stirred for 2 hours. Then, 3.5 g of an enamel frit (A1, available from Hae Kwang) was added to the solution, and 5 g of the mixture vehicle was added thereto to control a viscosity, and thus a paste composition was prepared.

The paste composition thus obtained was used to prepare a planar heating element in the same manner as used in Example 5.

Evaluation Example 5: Electrical Conductivity Evaluation

Electrical conductivities of the planar heating element of Example 5 and Comparative Example 5 were evaluated in the same manner as in Evaluation Example 4, and the results are shown in Table 4.

TABLE 4

|  | Electrical conductivity (S/m) |
|---|---|
| Comparative Example 5 | 0 |
| Example 5 | 333 |

As shown in Table 4, an electrical conductivity of the planar heating element of Comparative Example 5 appeared to be 0 due to degradation of the carbon nanotubes, whereas surfaces of carbon nanotubes of the planar heating element of Example 4 were passivated, which prevented degradation of the carbon nanotubes during a high temperature sintering process, and an electrical conductivity of the planar heating element of Example 4 was 333 S/m.

Evaluation Example 6: SEM Evaluation

Figure 10A:
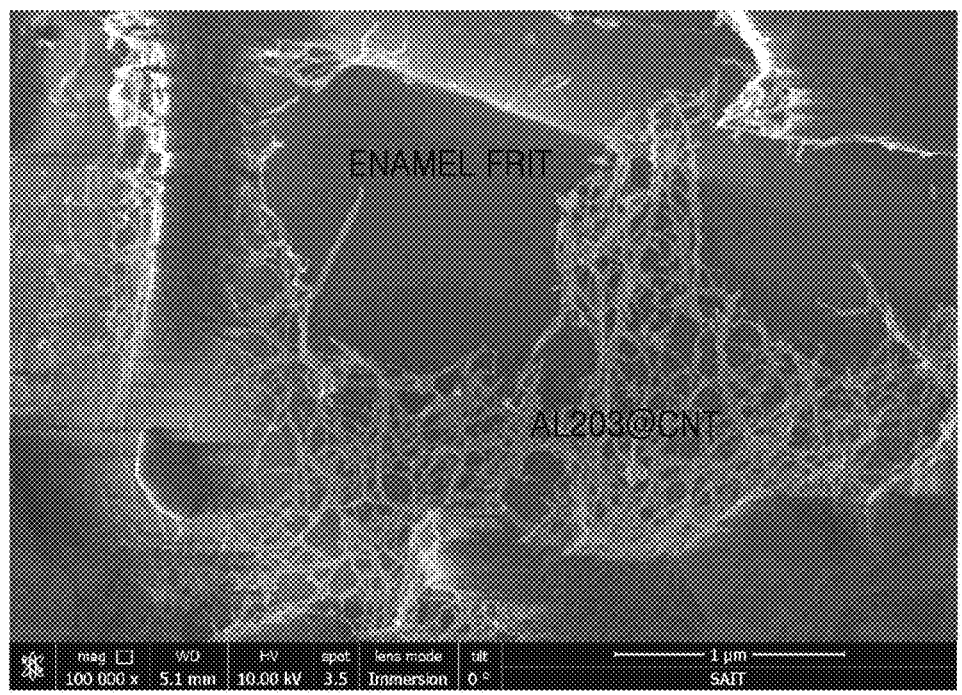
FIGS. 10A and 10B are SEM images of a planar heating element prepared in Example 5.
Figure 10B:
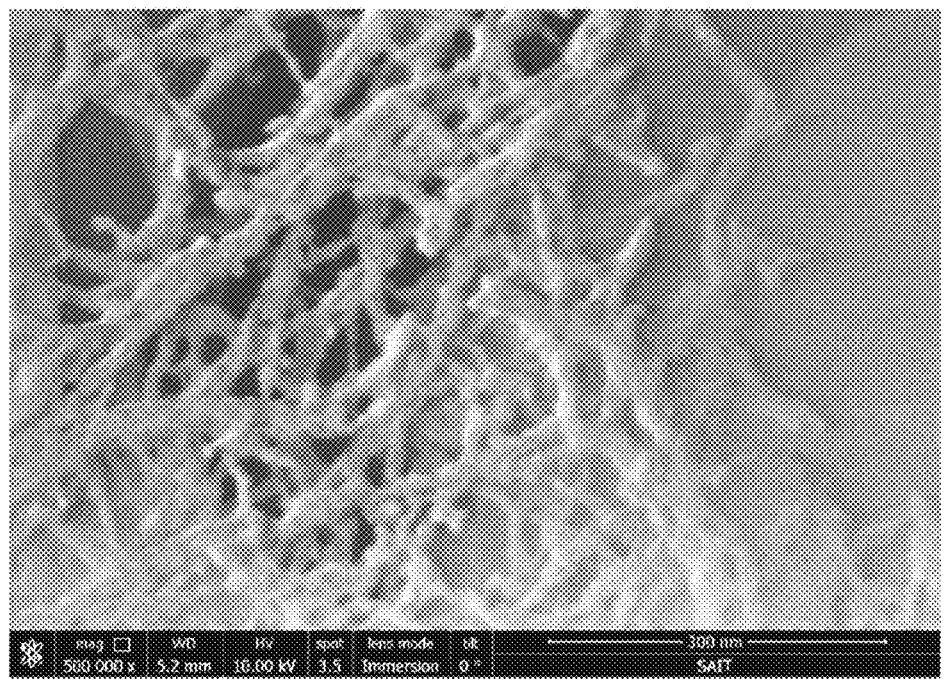
Figure 11:
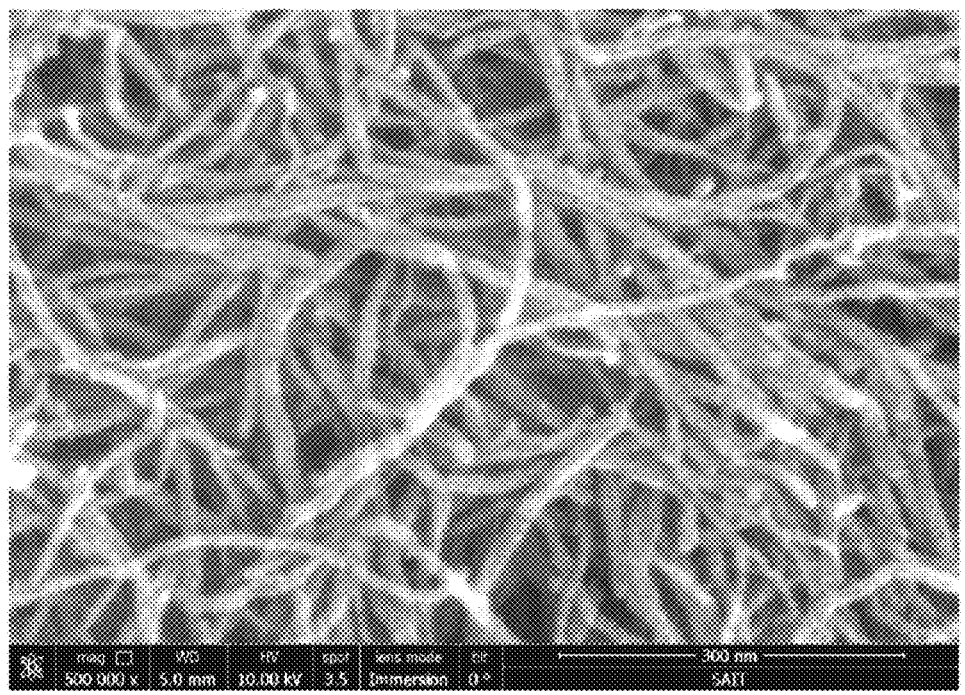
FIG. 11 is an SEM image of a planar heating element prepared in Example 6-1.
Figure 12:
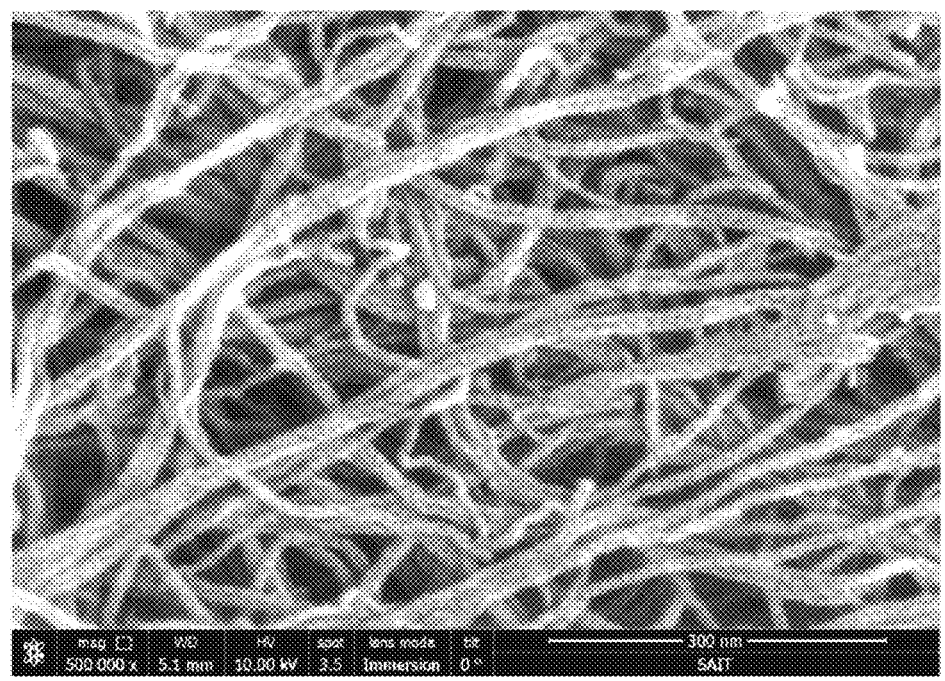
FIG. 12 is an SEM image of a planar heating element prepared in Example 6-2.
Figure 13:
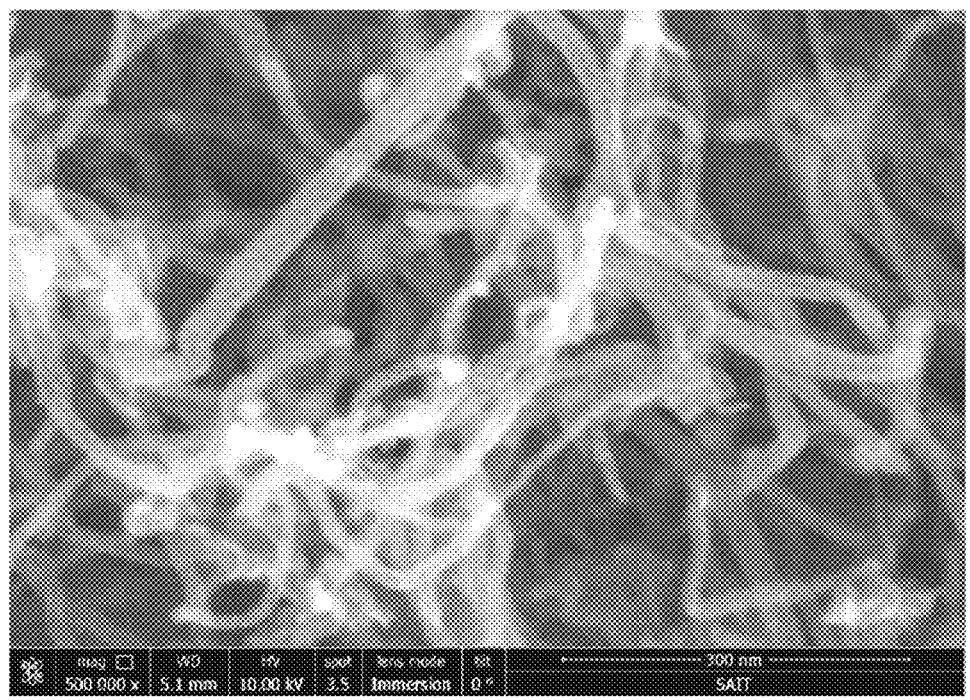
FIG. 13 is an SEM image of a planar heating element prepared in Example 6-3.
Figure 14:
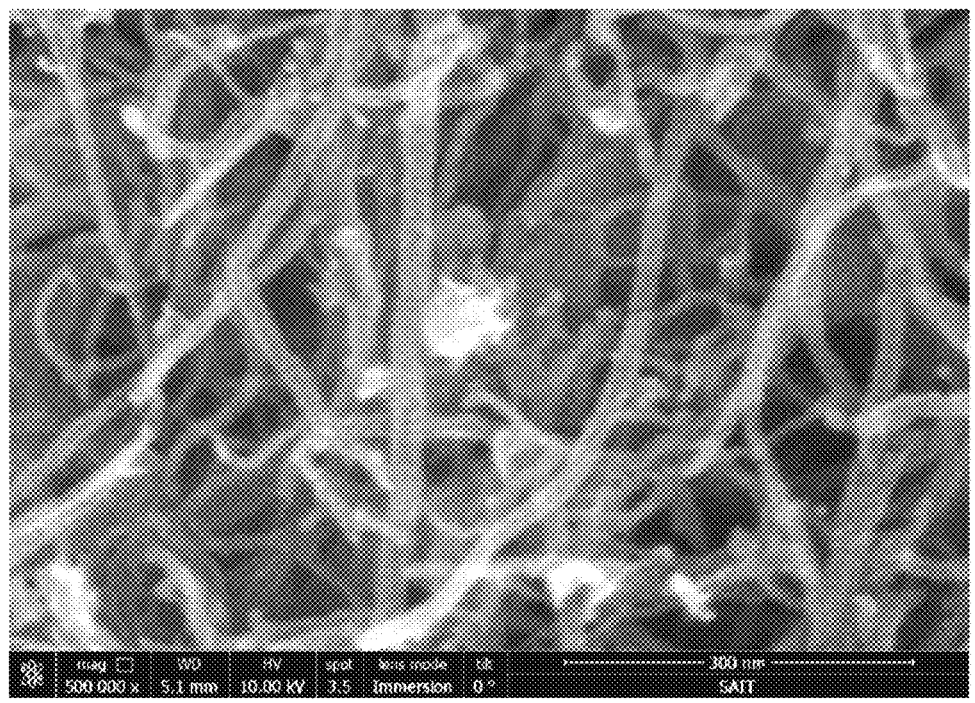
FIG. 14 is an SEM image of a planar heating element prepared in Example 6-4.

SEM images of the planar heating element of Example 5 are shown in FIGS. 10A and 10B.

As shown in FIGS. 10A and 10B, a passivation layer is formed as $Al_2O_3$ is coated on surfaces of the carbon nanotubes of the planar heating element of Example 5, and it may be known that the carbon nanotubes were not degraded and dispersed in an enamel frit. In the enlarged SEM image shown in FIG. 10B, it may be confirmed that a conductive channel of the carbon nanotubes was maintained in the state coated with $Al_2O_3$.

Examples 6-1 to 6-4: Oxidation Resistance Test According to Thickness of Passivation A planar heating element was prepared in the same manner as in Example 4, except that amounts of a metal precursor and carbon nanotube were controlled to follow weight ratios as shown in Table 4.

An atom % ratio of Si to C, a coating thickness of $SiO_2$, resistance and thermal decomposition temperature ($T_d$) in the bulk state of the planar heating element were measured and shown in Table 5.

SEM images of the planar heating element of Examples 6-1 to 6-4 are shown in FIGS. 11 to 14, respectively.

TABLE 5

|  | Metal precursor: CNT (Weight ratio) | Atom % ratio of Si/C | $SiO_2$ coating thickness (nm) | Resistance (Ω) | Thermal decomposition temperature ($T_d$) |
|---|---|---|---|---|---|
| Comparative Example | 0:1 | 0 | 0 | 6.8 | 622 |
| Example 6-1 | 0.2:1 | 0.013 | 20 | 3.2 | 693 |
| Example 6-2 | 0.5:1 | 0.020 | 20 | 3.4 | 705 |
| Example 6-3 | 1:1 | 0.094 | 25 | 4.3 | 710 |
| Example 6-4 | 2:1 | 0.143 | 35 | 4.4 | 734 |

As shown in Table 5, resistances increased according to an increase of the coating thickness of the passivation layer, and thus an exothermic effect may increase. Since the thermal decomposition temperature increases as the coating thickness of the passivation layer increases, degradation of the carbon nanotube may be suppressed and high-temperature oxidation resistance may improve.

It should be understood that embodiments described herein should be considered in a descriptive sense only and not for purposes of limitation. Descriptions of features, aspects, or advantages within each embodiment should be considered as available for other similar features, aspects, or advantages in other embodiments.

While one or more embodiments have been described with reference to the figures, it will be understood by those of ordinary skill in the art that various changes in form and details may be made therein without departing from the spirit and scope as defined by the following claims.

What is claimed is:

1. A paste composition comprising:
   a carbon nanotube;
   a microemulsion adsorbed on a surface of the carbon nanotube, wherein the microemulsion comprises a metal precursor and a surfactant; and
   an organic vehicle comprising at least one selected from an organic solvent and an organic binder,
   wherein an amount of the metal precursor is in a range of about 0.1 part by weight to about 200 parts by weight, based on 100 parts by weight of the carbon nanotube,
   wherein the organic solvent comprises at least one selected from acetone, acetylacetone, methylethyl ketone, methyl alcohol, ethyl alcohol, isopropyl alcohol, butyl alcohol, octanol, 2,2,4-trimethyl-1,3-pentanediol monoisobutyrateethylene glycol, polyethylene glycol, tetrahydrofuran, 1,2-butoxy ethane, dimethyl formamide, dimethyl acetamide, N-methyl-2-pyrrolidone, toluene, xylene, chloroform, dichlorobenzene, dimethylbenzene, trimethylbenzene, pyridine, methylnaphthalene, nitromethane, acrylonitrile, octadecylamine, aniline, dimethyl sulfoxide, diethylene glycol ethylether, ethyl acetate, butyl acetate, butyl carbitol acetate, propylene glycol monomethyl ether acetate, diethylene glycol monobutyl ether, terpineol, 2-phenoxy ethanol, butyl carbitol acetate, butyl carbitol, propylene glycol monomethylether, dipropylene glycol monomethylether, propylene glycol monomethylether propionate, ethylether propionate, gamma-butyrolactone, ethyl lactate, methyl cellosolve, ethyl cellosolve, butyl cellosolve, ethylene glycol, ethylene glycol monobutyl ether, cellosolve acetate, and butyl cellosolve acetate.

2. The paste composition of claim 1, wherein the microemulsion has a reverse micelle structure in which the surfactant surrounds the metal precursor.

3. The paste composition of claim 1, wherein the metal precursor is a metal salt comprising at least one metal selected from aluminum, silicon, magnesium, zirconium, tungsten, zinc, titanium, chrome, manganese, bismuth, tellurium, niobium, hafnium, indium, tin, copper, cobalt, lead, iron, molybdenum, nickel, and an alloy thereof.

4. The paste composition of claim 1, wherein the surfactant comprises at least one selected from a cationic surfactant, an anionic surfactant, a non-ionic surfactant, and an amphoteric surfactant.

5. The paste composition of claim 4, wherein the cationic surfactant comprises at least one compound selected from dodecyltrimethylammonium bromide, tetradecyltrimethylammonium bromide, cetyltrimethylammonium bromide, cetyldimethylethylammonium bromide, (C1 to C30 alkyl)-trimethylammonium bromide, a (C1 to C30 alkyl)amine, a (C1 to C30 alkyl) imidazoline, ethoxylated amine, a quaternary compound, a quaternary ester, a (C1 to C30 alkyl) amine oxide, lauramine oxide, dicetyldimonium chloride, cetrimonium chloride, a primary polyethoxylated fatty amine salt, a secondary polyethoxylated fatty amine salt, a tertiary polyethoxylated fatty amine salt, a quaternary ammonium salt, a tetra(C1 to C30 alkyl)ammonium halide, a (C1 to C30 alkyl)amide-(C1 to C30-alkyl)ammonium halide, a tri(C1 to C30 alkyl)benzylammonium halide, a tri(C1 to C30 alkyl)hydroxy-(C1 to C30 alkyl)ammonium halide, a (C1 to C30 alkyl)pyridinium chloride, a (C1 to C30 alkyl)pyridinium bromide, and a amine oxide.

6. The paste composition of claim 4, wherein the anionic surfactant comprises at least one compound selected from sodium dodecyl sulfate, a (C6 to C30 alkyl)benzene sulfonate, a C6 to C30 alpha olefin sulfonate, a paraffin sulfonate, a (C6 to C30 alkyl) ester sulfonate, a (C6 to C30 alkyl) sulfate, a (C6 to C30 alkyl alkoxy) sulfate, a (C6 to C30 alkyl) sulfonate, a (C6 to C30 alkyl alkoxy) carboxylate, a (C6 to C30 alkyl alkoxylated) sulfate, a mono(C1 to C30 alkyl)(ether) phosphate, a di(C6 to C30 alkyl)(ether) phosphate, a (C6 to C30 alkyl) sarcosinate, a sulfosuccinate, sodium bis(2-ethylhexyl) sulfosuccinate, ethoxylate 4-nonylphenyl ether glycolic acid, a (C1 to C30 alkyl) isethionate, taurate, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium lauryl phosphate, sodium tridecyl phosphate, sodium behenyl phosphate, sodium laureth-2 phosphate, sodium ceteth-3 phosphate, sodium trideceth-4 phosphate, sodium dilauryl phosphate, sodium ditridecyl phosphate, sodium ditrideceth-6 phosphate, sodium lauroyl sarcosinate, lauroyl sarcosine, cocoyl sarcosine, ammonium cocoyl sulfate, sodium cocoyl sulfate, sodium trideceth sulfate, sodium tridecyl sulfate, ammonium trideceth sulfate, ammonium tridecyl sulfate, sodium cocoyl isethionate, disodium laureth sulfosuccinate, sodium methyl oleoyl taurate, sodium laureth carboxylate, sodium trideceth carboxylate, sodium lauryl sulfate, potassium cocoyl sulfate, potassium lauryl sulfate, monoethanolamine cocoyl sulfate, sodium tridecyl benzene sulfonate, sodium dodecyl benzene sulfonate, and sodium dodecyl sulfate.

7. The paste composition of claim 4, wherein the nonionic surfactant comprises at least one selected from, a C6 to C18 alkyl alcohol, a (C6 to C18 alkyl) phenol, a (C6 to C18 alkyl) ethoxylate, a (C6 to C18 alkyl) phenol (C1 to C3 alkoxylate), a block oxy(C1 to C3 alkylene) condensate of a C6 to C18 alkyl phenol, an oxy(C1 to C3 alkylene) condensate of alkanol, an oxyethylene/oxypropylene block copolymer, an amine oxide, a phosphine oxide, an alkylamine oxide having 8 to 50 carbon atoms, a mono or di(C8 to C30) alkyl alkanolamide, a (C6 to C30 alkyl) polysaccharide, a sorbitan fatty acid ester, a polyoxyethylene sorbitan fatty acid ester, a polyoxyethylene sorbitol ester, a polyoxyethylene nonylphenyl ether, a polyoxyethylenic acid, a polyoxyethylene alcohol, a coco monoethanolamide, a coco diethanolamide, a coco diglycoside, a (C8 to C30 alkyl) polyglycoside, cocamidopropyl, lauramine oxide, polyoxyethylene (20) sorbitan monolaurate, an ethoxylated linear C8 to C30 alcohol, cetearyl alcohol, lanolin alcohol, stearic acid, glyceryl stearate, polyethylene glycol 100 stearate, 4-(1,1,3,3-tetramethylbutyl)phenyl polyethylene glycol, polyoxyethylene [10] cetyl ether, eicosaethylene glycol octadecyl ether, and $HO(CH_2CH_2O)_{20}(CH_2CH(CH_3)O)_{70}(CH_2CH_2O)_{20}H$.

8. The paste composition of claim 1, wherein an amount of the surfactant is in a range of about 50 parts by weight to about 10,000 parts by weight, based on 100 parts by weight of the metal precursor.

9. The paste composition of claim 1, wherein the carbon nanotube comprises at least one selected from a single-walled carbon nanotube, a double-walled carbon nanotube, a multi-walled carbon nanotube, and a bundled carbon nanotube.

10. The paste composition of claim 1, wherein the organic binder comprises at least one selected from a cellulose, an acrylic polymer, a styrene polymer, a polyvinyl resin, a (C1 to C6 alkyl) methacrylate ester polymer, a (C1 to C6 alkyl) acrylate ester polymer, a styrene-acrylate ester copolymer, polystyrene, polyvinyl butyral, polyvinyl alcohol, polyethylene oxide, polypropylene carbonate, polymethylmethacrylate, an ammonium acrylate polymer, arabic gum, gelatin, an alkyd resin, a butyral resin, a saturated polyester, a natural rubber, a silicone rubber, a fluorosilicone, a fluoroelastomer, and a synthetic rubber.

11. The paste composition of claim 1, wherein an amount of the organic vehicle is in a range of about 1 part by weight to about 10,000 parts by weight, based on 100 parts by weight of the carbon nanotube.

12. The paste composition of claim 1, further comprising at least one selected from a metallic filler, an inorganic filler, a glass frit, and an enamel frit.

13. The paste composition of claim 12, wherein the glass frit comprises at least one selected from zinc oxide, silicon oxide, boron oxide, bismuth oxide, aluminum oxide, lithium oxide, sodium oxide, potassium oxide, titanium oxide, manganese oxide, cobalt oxide, nickel oxide, copper oxide, and zirconium oxide.

14. The paste composition of claim 12, wherein the glass frit comprises at least one selected from a zinc oxide-silicon oxide compound, a zinc oxide-boron oxide-silicon oxide compound, a boron oxide-sodium oxide-silicon oxide compound, a zinc oxide-boron oxide-silicon oxide-aluminum oxide compound, a bismuth oxide-silicon oxide compound, a bismuth oxide-boron oxide-silicon oxide compound, a bismuth oxide-boron oxide-silicon oxide-aluminum oxide compound, a bismuth oxide-zinc oxide-boron oxide-silicon oxide compound, and a bismuth oxide-zinc oxide-boron oxide-silicon oxide-aluminum oxide compound.

15. The paste composition of claim 1, wherein the paste composition is sinterable within a temperature range of about 400° C. to about 1200° C.

16. A method of preparing the paste composition of claim 1, the method comprising:
dispersing a surfactant in an organic vehicle;
adding a metal precursor-containing aqueous solution to the organic vehicle to form a microemulsion; and
dispersing a carbon nanotube into the organic vehicle to form the paste composition, wherein the microemulsion is adsorbed on a surface of the carbon nanotube,
wherein an amount of the metal precursor is in a range of about 0.1 part by weight to about 200 parts by weight, based on 100 parts by weight of the carbon nanotube,
wherein the aqueous solution comprises at least one selected from an organic solvent and an organic binder, and
wherein the organic solvent comprises at least one selected from acetone, acetylacetone, methylethyl ketone, methyl alcohol, ethyl alcohol, isopropyl alcohol, butyl alcohol, octanol, 2,2,4-trimethyl-1,3-pentanediol monoisobutyrateethylene glycol, polyethylene glycol, tetrahydrofuran, 1,2-butoxy ethane, dimethyl formamide, dimethyl acetamide, N-methyl-2-pyrrolidone, toluene, xylene, chloroform, dichlorobenzene, dimethylbenzene, trimethylbenzene, pyridine, methylnaphthalene, nitromethane, acrylonitrile, octadecylamine, aniline, dimethyl sulfoxide, diethylene glycol ethylether, ethyl acetate, butyl acetate, butyl carbitol acetate, propylene glycol monomethyl ether acetate, diethylene glycol monobutyl ether, terpineol, 2-phenoxy ethanol, butyl carbitol acetate, butyl carbitol, propylene glycol monomethylether, dipropylene glycol monomethylether, propylene glycol monomethylether propionate, ethylether propionate, gamma-butyrolactone, ethyl lactate, methyl cellosolve, ethyl cellosolve, butyl cellosolve, ethylene glycol, ethylene glycol monobutyl ether, cellosolve acetate, and butyl cellosolve acetate.

17. A method of preparing a heating element, the method comprising:
sintering the paste composition of claim 1 within a temperature range of about 400° C. to about 1200° C. to prepare the heating element.

18. A method of preparing a planar heating element, the method comprising:
coating the paste composition of claim 1 on a substrate; and
sintering the paste composition within a temperature range of about 400° C. to about 1200° C. to prepare the planar heating element.

19. A paste composition comprising:
a carbon nanotube;
a microemulsion adsorbed on a surface of the carbon nanotube, wherein the microemulsion comprises a metal precursor and a surfactant;
an organic vehicle; and
at least one selected from a metallic filler, an inorganic filler, a glass frit, and an enamel fit,
wherein an amount of the metal precursor is in a range of about 0.1 part by weight to about 200 parts by weight, based on 100 parts by weight of the carbon nanotube,
wherein the metallic filler comprises at least one selected from gold, silver, platinum, ruthenium, iridium, aluminum, copper, cobalt, nickel, tin, molybdenum, manganese, zirconium, zinc, iron, tungsten, titanium, and an alloy thereof.

20. The paste composition of claim 19, wherein the inorganic filler comprises at least one selected from calcium carbonate, magnesium carbonate, calcium sulfate, magnesium sulfate, iron oxide, zinc oxide, magnesium oxide, aluminum oxide, calcium oxide, titanium oxide, calcium hydroxide, magnesium hydroxide, aluminum hydroxide, amorphous silica, fumed silica, synthetic silica, natural zeolite, synthetic zeolite, bentonite, activated clay, talc, kaolin, mica, diatomite, and clay.

* * * * *